(12) United States Patent
Ford

(10) Patent No.: US 8,950,318 B2
(45) Date of Patent: Feb. 10, 2015

(54) BREWER SYSTEM WITH ACTIVE BREWING MECHANISM AND BUFFER RESERVOIR PISTON COMPRESSION OF BREWING SUBSTANCE

(75) Inventor: David Ford, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 617 days.

(21) Appl. No.: 12/934,362

(22) PCT Filed: Mar. 24, 2009

(86) PCT No.: PCT/US2009/038125
§ 371 (c)(1),
(2), (4) Date: Dec. 21, 2010

(87) PCT Pub. No.: WO2009/120708
PCT Pub. Date: Oct. 1, 2009

(65) Prior Publication Data
US 2011/0086148 A1    Apr. 14, 2011

Related U.S. Application Data

(60) Provisional application No. 61/039,071, filed on Mar. 24, 2008, provisional application No. 61/100,537, filed on Sep. 26, 2008.

(51) Int. Cl.
*A47J 31/46* (2006.01)
*A47J 31/18* (2006.01)
*A47J 31/52* (2006.01)

(52) U.S. Cl.
CPC ................ *A47J 31/18* (2013.01); *A47J 31/467* (2013.01); *A47J 31/52* (2013.01)
USPC ............................ 99/302 P; 426/433; 99/287

(58) Field of Classification Search
USPC ......... 99/302 P, 302 R, 289 R, 287, 299, 280, 99/283
See application file for complete search history.

(56) References Cited

U.S. PATENT DOCUMENTS 1,751,397 A      3/1930   Delsuc
2,485,246 A  *  10/1949   Swanson ......................... 99/283
(Continued)

FOREIGN PATENT DOCUMENTS

DE        2432141        1/1976
EP        0473289        3/1992
(Continued)

OTHER PUBLICATIONS

Supplemental Search Report issued in App. No. EP 09725061.7 (2011).

(Continued)

*Primary Examiner* — Joseph M Pelham
*Assistant Examiner* — Jimmy Chou
(74) *Attorney, Agent, or Firm* — Barnes & Thornburg LLP

(57) ABSTRACT

The present disclosure relates to an apparatus, system, and method of use for producing beverages. The apparatus includes at least a modular brewing mechanism. Also, the system includes a reservoir for retaining a volume of beverage produced by the brewing mechanism. The system includes controls for dispensing a single cup of beverage while producing multiple cycles of beverage for transfer to the reservoir. The system also includes controls for monitoring freshness of beverage, controllably disposing of beverage, and controlling production of single cup or batch production of beverage. The method and apparatus includes controllable pressurized brewing in a column or chamber using a controllable piston moving in the chamber and which may include controlling steep time, pressurization, extraction time, active controllable agitation of the brewing substance, as well as other brewing characteristics.

7 Claims, 30 Drawing Sheets

(56) References Cited

U.S. PATENT DOCUMENTS

| | | | | |
|---|---|---|---|---|
| 2,584,187 | A * | 2/1952 | Crist | 219/386 |
| 2,660,948 | A | 12/1953 | Forschner | |
| 2,673,920 | A * | 3/1954 | Donovan et al. | 392/484 |
| 2,786,929 | A * | 3/1957 | Michaelis | 219/448.13 |
| 2,955,527 | A * | 10/1960 | Collins et al. | 99/283 |
| 3,106,149 | A * | 10/1963 | Vukasin et al. | 99/283 |
| 3,266,410 | A | 8/1966 | Novi et al. | |
| 3,288,049 | A | 11/1966 | Schmid et al. | |
| 3,343,478 | A * | 9/1967 | Hausam | 99/283 |
| 3,347,150 | A * | 10/1967 | Hrabe | 99/283 |
| 3,349,690 | A | 10/1967 | Heier | |
| 3,379,117 | A * | 4/1968 | Richeson | 99/283 |
| 3,478,670 | A * | 11/1969 | Fuqua | 99/283 |
| 3,517,603 | A * | 6/1970 | Heifetz et al. | 99/283 |
| 3,565,641 | A | 2/1971 | King | |
| 3,589,273 | A | 6/1971 | Karlen | |
| 3,632,982 | A * | 1/1972 | Linger | 219/448.17 |
| 3,727,541 | A | 4/1973 | Krueger | |
| 3,797,375 | A * | 3/1974 | Cerola | 99/340 |
| 4,098,175 | A | 7/1978 | Fierz | |
| 4,207,809 | A * | 6/1980 | Brill | 99/279 |
| 4,271,752 | A | 6/1981 | Valente et al. | |
| 4,271,753 | A * | 6/1981 | Neely | 99/289 R |
| 4,309,939 | A * | 1/1982 | Stover | 99/280 |
| D269,011 | S | 5/1983 | Stetler et al. | D7/308 |
| 4,415,788 | A * | 11/1983 | Field | 219/623 |
| 4,431,892 | A * | 2/1984 | White | 219/623 |
| 4,506,596 | A | 3/1985 | Shigenobu et al. | |
| 4,550,651 | A | 11/1985 | Haynes | |
| 4,632,023 | A | 12/1986 | King | |
| 4,653,389 | A | 3/1987 | Hayes | |
| 4,653,390 | A | 3/1987 | Hayes | |
| 4,778,978 | A * | 10/1988 | Schreder et al. | 219/451.1 |
| 4,779,520 | A | 10/1988 | Häuslein | |
| 4,791,859 | A * | 12/1988 | King | 99/289 R |
| 4,797,296 | A | 1/1989 | Meier et al. | |
| 4,823,685 | A | 4/1989 | Boumans et al. | |
| 4,863,066 | A * | 9/1989 | Uffenheimer et al. | 222/1 |
| 4,869,158 | A * | 9/1989 | Brewer | 99/279 |
| 4,869,231 | A * | 9/1989 | Rice et al. | 126/214 R |
| 4,885,986 | A | 12/1989 | Grossi | |
| 4,967,647 | A * | 11/1990 | King | 99/280 |
| 5,000,082 | A * | 3/1991 | Lassota | 99/304 |
| 5,127,317 | A | 7/1992 | Takayanagi et al. | |
| 5,134,925 | A * | 8/1992 | Bunn et al. | 99/289 R |
| 5,146,839 | A | 9/1992 | Göckelmann et al. | |
| 5,158,793 | A * | 10/1992 | Helbling | 426/231 |
| 5,179,373 | A * | 1/1993 | John | 340/5.9 |
| 5,186,096 | A | 2/1993 | Willi | |
| 5,197,373 | A | 3/1993 | De Jong | |
| 5,215,074 | A * | 6/1993 | Wilson et al. | 126/214 R |
| 5,230,278 | A * | 7/1993 | Bunn et al. | 99/289 R |
| 5,245,914 | A * | 9/1993 | Vitous | 99/280 |
| 5,255,593 | A * | 10/1993 | Bunn et al. | 99/280 |
| 5,259,296 | A | 11/1993 | Mikael et al. | |
| 5,297,472 | A | 3/1994 | Suzuki et al. | |
| 5,303,639 | A * | 4/1994 | Bunn et al. | 99/289 R |
| 5,309,819 | A * | 5/1994 | Ford | 99/280 |
| 5,309,821 | A * | 5/1994 | Knepler | 99/282 |
| 5,312,637 | A * | 5/1994 | Midden | 426/433 |
| 5,372,832 | A * | 12/1994 | Bunn et al. | 426/433 |
| 5,393,540 | A * | 2/1995 | Bunn et al. | 426/231 |
| 5,406,882 | A * | 4/1995 | Shaanan | 99/287 |
| 5,471,910 | A | 12/1995 | Sager | |
| 5,476,033 | A * | 12/1995 | Locati | 99/279 |
| 5,505,845 | A * | 4/1996 | Ford | 210/117 |
| 5,515,772 | A * | 5/1996 | De Groen | 99/289 T |
| 5,623,574 | A | 4/1997 | Knepler | |
| 5,638,739 | A | 6/1997 | Shaanan et al. | |
| 5,647,055 | A | 7/1997 | Knepler | |
| 5,722,313 | A * | 3/1998 | Schmed | 99/289 R |
| 5,847,364 | A * | 12/1998 | White et al. | 219/452.12 |
| 5,859,410 | A * | 1/1999 | White et al. | 219/452.11 |
| 5,865,096 | A * | 2/1999 | Kawabata | 99/302 P |
| 5,896,805 | A * | 4/1999 | Katou et al. | 99/289 R |
| 5,913,963 | A | 6/1999 | King | |
| 5,937,738 | A | 8/1999 | Okamura et al. | |
| 5,941,163 | A | 8/1999 | Park et al. | |
| 5,957,035 | A | 9/1999 | Richter | |
| 6,079,314 | A * | 6/2000 | Mackinnon | 99/289 R |
| 6,079,317 | A | 6/2000 | Fukushima et al. | |
| 6,098,524 | A | 8/2000 | Reese | |
| 6,155,158 | A * | 12/2000 | Anson | 99/280 |
| 6,176,172 | B1 | 1/2001 | Stettes et al. | |
| 6,220,147 | B1 | 4/2001 | Priley | |
| 6,250,208 | B1 | 6/2001 | Helps et al. | |
| 6,271,504 | B1 * | 8/2001 | Barritt | 219/452.13 |
| 6,279,461 | B1 | 8/2001 | Fukushima et al. | |
| 6,298,769 | B1 | 10/2001 | Stettes et al. | |
| 6,324,964 | B1 | 12/2001 | Niederberger et al. | |
| 6,391,360 | B1 | 5/2002 | Stettes et al. | |
| 6,399,925 | B1 * | 6/2002 | Pickering et al. | 219/452.13 |
| 6,401,597 | B1 | 6/2002 | Stettes et al. | |
| 6,439,105 | B1 * | 8/2002 | Ford | 99/280 |
| 6,455,818 | B1 * | 9/2002 | Arntz et al. | 219/452.11 |
| 6,488,976 | B1 | 12/2002 | Priley | |
| 6,492,622 | B2 * | 12/2002 | Melson et al. | 219/452.11 |
| 6,513,419 | B2 | 2/2003 | Huber et al. | |
| 6,564,697 | B2 | 5/2003 | Maxwell et al. | |
| 6,674,051 | B2 * | 1/2004 | Arntz et al. | 219/450.1 |
| 6,712,066 | B1 * | 3/2004 | Atkinson et al. | 126/214 R |
| 6,739,240 | B2 | 5/2004 | De Koning et al. | 99/283 |
| 6,827,003 | B2 * | 12/2004 | Versini | 99/287 |
| 6,829,981 | B2 * | 12/2004 | Lassota | 99/299 |
| 6,903,309 | B2 * | 6/2005 | Rhinehart | 219/452.13 |
| 7,024,985 | B2 * | 4/2006 | Park | 99/302 P |
| 7,066,079 | B2 | 6/2006 | Sager | |
| 7,158,918 | B2 | 1/2007 | Bunn et al. | |
| 7,162,391 | B2 | 1/2007 | Knepler et al. | |
| 7,163,126 | B2 | 1/2007 | Knepler | |
| 7,197,377 | B2 | 3/2007 | Knepler | |
| 7,223,427 | B2 | 5/2007 | Knepler | |
| 7,227,106 | B2 * | 6/2007 | Sung et al. | 219/452.11 |
| 7,228,066 | B2 | 6/2007 | Pope | |
| 7,268,698 | B2 | 9/2007 | Hart et al. | |
| 7,270,050 | B2 * | 9/2007 | Glucksman et al. | 99/297 |
| D551,901 | S | 10/2007 | Hulett et al. | |
| D557,057 | S * | 12/2007 | Einav | D7/307 |
| D562,051 | S | 2/2008 | Hulett et al. | |
| 7,827,904 | B2 | 11/2010 | Kobylarz | |
| 7,849,784 | B2 | 12/2010 | Adler | |
| 8,011,920 | B2 * | 9/2011 | Deng | 431/12 |
| 8,210,093 | B2 * | 7/2012 | Knepler | 99/280 |
| 8,613,245 | B1 * | 12/2013 | Lassota | 99/283 |
| 2004/0045952 | A1 * | 3/2004 | Rhinehart | 219/452.13 |
| 2004/0177761 | A1 | 9/2004 | Park | |
| 2004/0177762 | A1 | 9/2004 | Gutwein et al. | |
| 2005/0051033 | A1 * | 3/2005 | Lassota | 99/283 |
| 2005/0160919 | A1 | 7/2005 | Balkau | |
| 2006/0096469 | A1 | 5/2006 | Morin et al. | |
| 2006/0174773 | A1 | 8/2006 | Taylor | |
| 2006/0230946 | A1 | 10/2006 | Cheng | |
| 2007/0034083 | A1 | 2/2007 | Van Hattem et al. | |
| 2007/0068393 | A1 | 3/2007 | Nosler et al. | |
| 2008/0223464 | A1 * | 9/2008 | Merrell | 137/625 |
| 2008/0264266 | A1 * | 10/2008 | Carbonini et al. | 99/289 R |
| 2009/0095165 | A1 | 4/2009 | Nosler et al. | |
| 2009/0317526 | A1 | 12/2009 | Tacklind et al. | |
| 2010/0203207 | A1 | 8/2010 | Clark et al. | |
| 2010/0203209 | A1 * | 8/2010 | Fishbein et al. | 426/433 |
| 2011/0097466 | A1 | 4/2011 | Vastardis | |

FOREIGN PATENT DOCUMENTS

| | | |
|---|---|---|
| EP | 0280345 | 8/1998 |
| EP | 1747738 | 1/2007 |
| FR | 1565033 | 4/1969 |
| JP | H09-62931 | 3/1997 |
| WO | WO 86/05670 | 10/1986 |
| WO | WO 93/15640 | 8/1993 |

(56) References Cited

FOREIGN PATENT DOCUMENTS

| | | |
|---|---|---|
| WO | WO 01/074212 | 10/2001 |
| WO | WO 03/101264 | 12/2003 |
| WO | WO 2004/023949 | 3/2004 |
| WO | WO 2006/003128 | 1/2006 |
| WO | WO 2007/027206 | 3/2007 |
| WO | WO 2007/035877 | 3/2007 |

OTHER PUBLICATIONS

Office Action issued in App. No. EP 09725061.7 (2012).
Int'l Search Report & Written Opinion issued in application No. PCT/US09/38125 (2009).
Office Action issued in App. No. JP 2011-501986, pp. 1-2 (Jan. 10, 2014).

* cited by examiner

BREWER SYSTEM WITH ACTIVE BREWING MECHANISM AND BUFFER RESERVOIR PISTON COMPRESSION OF BREWING SUBSTANCE

This patent application is a U.S. nationalization under 35 USC §371 of International Application No. PCT/US2009/038125, filed Mar. 24, 2009, which claims priority under 35 U.S.C. 119(e) to U.S. Provisional Patent Application No. 61/039,071, filed Mar. 24, 2008, and U.S. Provisional Patent Application No. 61/100,537, filed Sep. 26, 2008. The disclosures set forth in the referenced applications are incorporated herein by reference in their entireties, including all information as originally submitted to the United States Patent and Trademark Office.

BACKGROUND

The present disclosure relates to an apparatus, system, and method of use for producing beverages. The apparatus includes at least a modular brewing mechanism. Also, the system includes a reservoir for retaining a volume of beverage produced by the brewing mechanism. The system includes controls for dispensing a single cup of beverage while producing multiple cycles of beverage for transfer to the reservoir. The system also includes controls for monitoring freshness of beverage, controllably disposing of beverage, and controlling production of single cup or batch production of beverage. The method and apparatus includes controllable pressurized brewing in a column or chamber using a controllable piston moving in the chamber and which may include controlling steep time, pressurization, extraction time, active controllable agitation of the brewing substance, as well as other brewing characteristics.

A variety of beverage producing systems have been produced. One form of beverage production is referred to as "brewing". Brewing involves the dispensing of heated water into a brewing substance, such as coffee, tea, herbs, botanicals, as well as other substances. In the brewing process, the heated water infuses and extracts flavors from the brewing substance. The brewing substance and water is contained within a filter structure to allow beverage to drain from the infused brewing substance and water mixture.

A variety of brewing apparatus and systems have been developed. Drip brewing systems allow the beverage to drain through a filter under force of gravity. An example of a drip brewing system involves a brewing funnel which contains the brewing substance and receives water. The funnel is lined with a filter material, either disposable or reusable. The brewing substance is placed in the filter of the funnel and water is dispensed over the brewing substance. Beverage drains from the filter through an opening in the funnel for dispensing into a cup or larger container such as a carafe.

Some automated systems have been developed which employ a brewing chamber constructed to approximate a funnel and filter structure. The automated mechanism includes a piston which moves through a central portion of the chamber to controllably open and close a drain area within the chamber. The controllable piston also includes a water line which can be used to controllably dispense water over brewing substance contained in the chamber. This system generally works on similar principles similar to the drip brewing system such that gravity is employed, at least in part, to drain beverage from the system.

Another form of brewing system involves a technique referred to as "French press". In a French press system coffee is placed in a container and water is pour over the coffee and is maintained in direct contact for the duration of the brewing process. The heated water is mixed with the brewing substance to produce a beverage. A plunger which includes a filter is placed in the container and pressed downwardly over the water and brewing substance mixture. Beverage passes through the filter and remains on top of the filter with the remaining spent brewing substance being trapped between the filter and the bottom of the container. The brewed beverage can then be dispensed from the container.

Another prior art version of an automated brewing apparatus has often been used in the cup dispensing vending machine industry. This form of brewing technique uses a reverse, vacuum, or suction French press technique. In this vending system, coffee is dispensed into a brewing chamber. Water is combined with the coffee and may be allowed to steep. The piston is moved to draw the brewed beverage through a filter under force of suction and allow brewed beverage to drain from the chamber. The spent grounds are then removed from the filter in preparation for subsequent brewing cycle.

One of the problems with some of the prior art techniques is that while they are capable of brewing sufficient single cups they provide little flexibility in producing larger volumes. Similarly, some of the techniques which produce larger volumes of beverage are generally not capable of producing single cups. As such it would be desirable to provide a system which produces high quality single cup beverages using a brewing technique and which is also capable of brewing larger volumes. It would be useful to provide a controllable apparatus which can produce single cups of brewed beverage. It would also be desirable to provide a brewing apparatus which can controllably produce larger volumes of brewed beverage using the same mechanism as is used to produce single cups and to dispense the volume into a buffer reservoir for subsequent controlled dispensing. Such a system would be useful to improve efficiency, quality and cost effectiveness of a brewing system. Such a system would be capable of accommodating low demand brew periods as well as peak demand brew periods.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
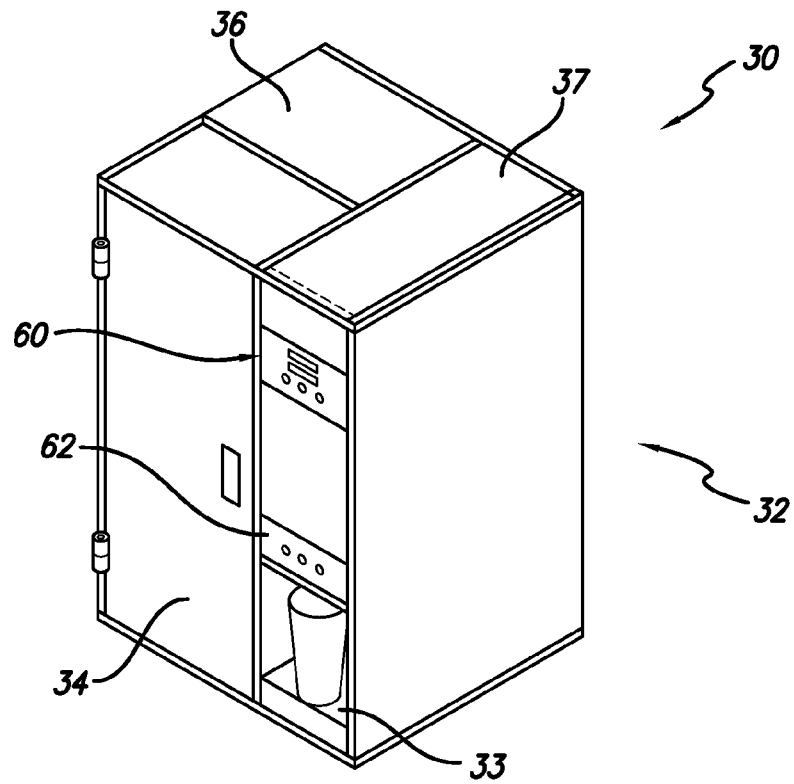
FIG. 1 is a perspective view of a beverage producing apparatus which includes a control panel on a housing or cabinet for controlling the dispensing of beverage into a serving container or cup.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Disclosed is a beverage producing apparatus 30 which is in the form of a brewer system including an active column brewing mechanism 40. Active brewing in such a column brewing mechanism 40 is differentiated from passive brewing such that components of the mechanism 40 operate on the brewing substance and water to produce a beverage. Also, the active brewing mechanism includes controllable features to provide controlled actuation of the components of the mechanism 40 to provide alteration of the resultant brewed beverage characteristics and taste profile.

The present disclosure is intended to be a broad general disclosure relating to the structures and methods for producing a beverage using the teachings of the present disclosure. The present disclosure should be understood to be applicable for use with a variety of manual, semiautomatic, or automatic beverage making apparatus including, but not limited to, brewing systems. One of skill in the art empowered with the teachings as provided herein can find utility and application for this disclosure in a variety of mechanisms and systems.

Brewing substance or beverage making substance is referred to by way of illustration and not limitation. While reference to the brewing substance "coffee" will be used throughout this description in the interest of clarity and simplicity, it will be understood that any form of beverage making substance may be used to produce a beverage. It should be noted that the present disclosure may refer to a coffee in reference to beverage making substance throughout the remainder of the description in the interest of clarity and simplicity. However, it will be understood that any form of beverage making substance may be used to produce a beverage and the term coffee is intended to be broadly interpreted. This broad interpretation is also intended to include, but is not limited to, beverage substances such as ground coffee, tea, herbs, botanicals, liquid beverage concentrate, ground, pulverized, rough cut, whole, powdered beverage concentrate, flaked, granular, freeze dried or other forms of materials including liquid, gel, crystal or obtain a desired beverage or other food product or any other forms of beverage substance or food products.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified.

Also, water is referred to in the specification by way of illustration and not limitation. It is understood that the liquid or water it to be broadly interpreted to include any type of liquid used to produce a beverage, including, but not limited to water, milk, juices, etc.

The apparatus 30 includes a housing 32 having a cabinet portion 37, a cabinet door 34, and a top panel 36. A control panel 60 is provided on a front face of the housing 32. A dispensing area 33 is provided for positioning a serving container, as illustrated, a cup under a dispensing nozzle 35 positioned therein. While a dispensing area 33 is shown and described having a volume and dimensions generally compatible with a single cup, it is envisioned that this area 33 could be sized and dimensioned to receive a carafe or other larger volume container for filling at the brewing apparatus 30. All variations of container size and container types are included within the scope of the present disclosure with the disclosure intended to not be limiting. While reference to a cup will be used herein in the interest of clarity and simplicity it will be used by way of illustration and not limitation.

Figure 4:
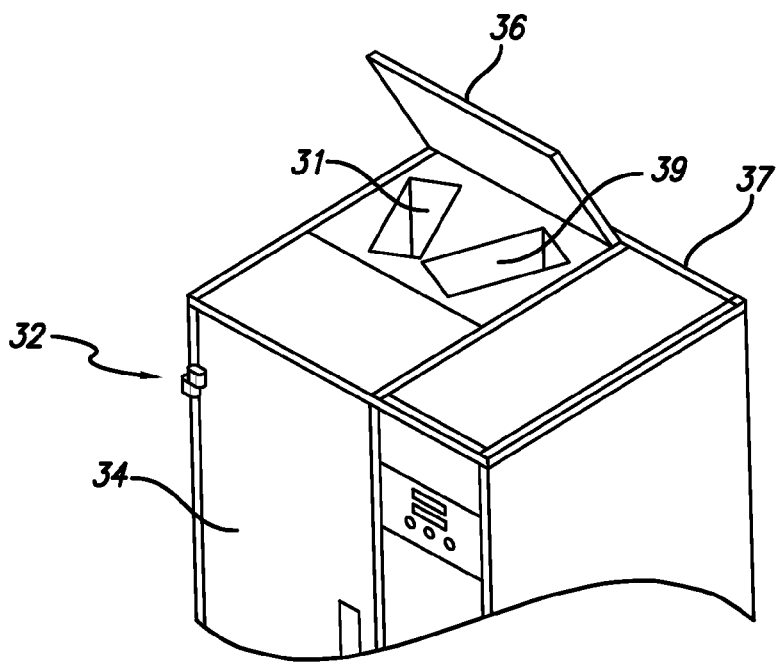
FIG. 4 is a top perspective view of the cabinet showing displacement of a top panel to reveal a pair of beverage hoppers used to supply beverage brewing substance to the modular brewing mechanism.

Positioned under the top panel (see FIG. 4) are hopper openings 31, 39 which allow an operator to fill two types of ground coffee into the apparatus 30. The ground coffee may be in the form of decaf and regular or different flavors as well as coffee and tea or other substances. The top panel 36 covers the hoppers 31, 39 to prevent inadvertent placement of other substances into the hoppers 31, 39. Alternatively, a grinding system may be used with the present apparatus. As such, the hoppers 31, 39 would hold fresh coffee beans or other beverage making substance for grinding and dispensing into the beverage making system.

Figure 3:
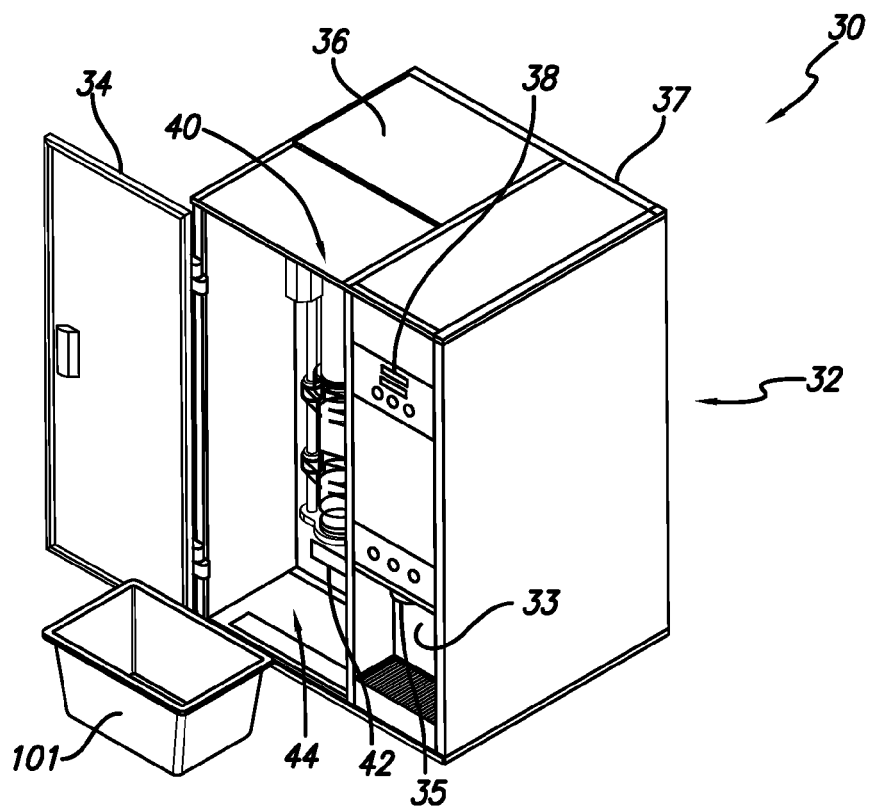
FIG. 3 is a view of the beverage producing apparatus as shown in FIG. 1 in which a cabinet door has been opened to reveal a modular brewing mechanism and in which a grounds tray has been removed from the cabinet.
Figure 5:
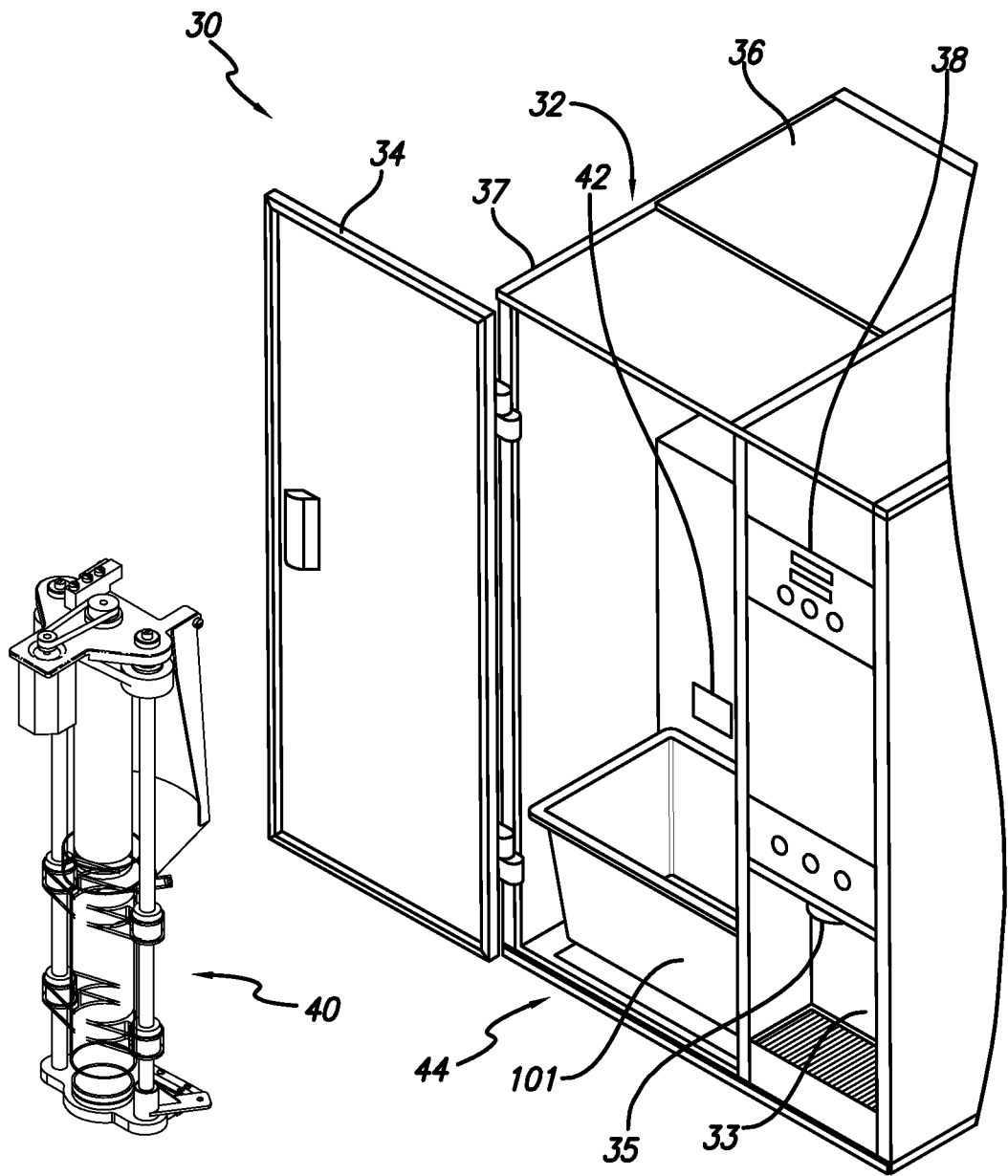
FIG. 5 shows the beverage producing apparatus of FIG. 1 in which the brewing mechanism has been removed from the cabinet.

With reference to FIG. 3, the brewing mechanism 40 dispenses beverage into a dispensing assembly 42 which is connected to the nozzle 35 for dispensing beverage to the container. The mechanism 40 is removable from the dispensing apparatus 42 so that it can be removed from the cabinet portion 37 of the housing 30 (see FIG. 5).

Figure 2:
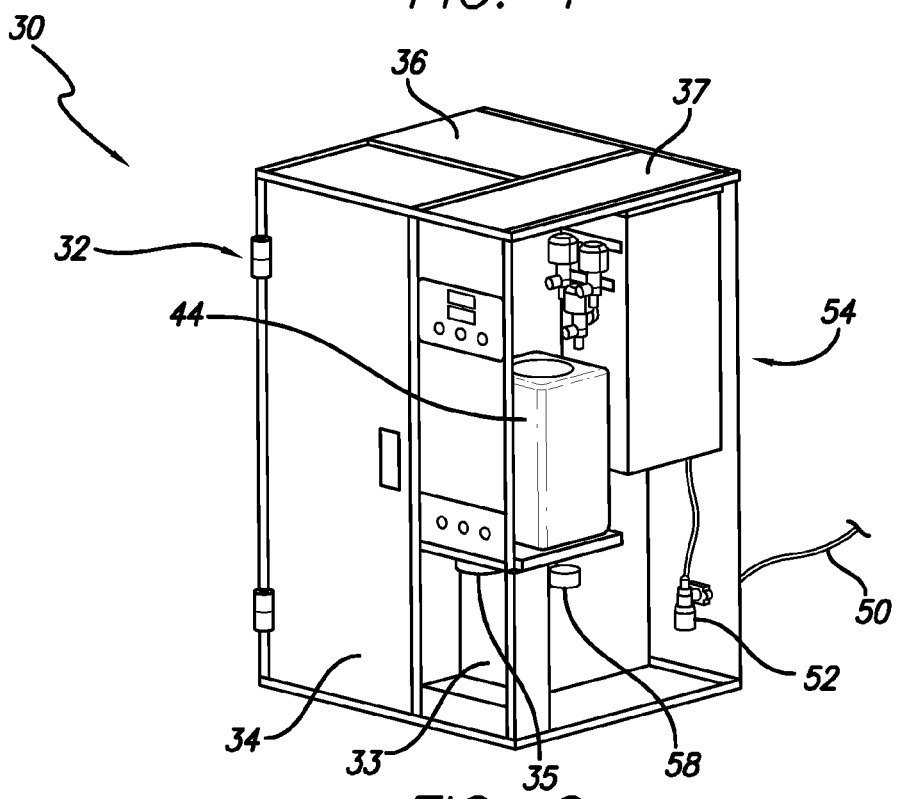
FIG. 2 is a partial fragmentary view of the beverage producing apparatus shown in FIG. 1 revealing a heated water reservoir used to produce heated water for use in the brewing process, and a buffer reservoir for containing a volume of beverage produced by the apparatus, the proximity of the heated water reservoir and buffer reservoir providing efficient energy utilization such that any heat escaping from the heated water reservoir to the ambient environment within the housing can be used to benefit maintenance of a desired temperature in the buffer reservoir.

With further reference to FIG. 2, the brewing mechanism can dispense multiple quantities, for example repeated brewing cycles, to dispense beverage into a buffer reservoir 44. The buffer reservoir 44 can be provided as a thermally insulated container which can accommodate multiple dispensing volumes of beverage produced by or from the brewing mechanism 40. Alternatively, the reservoir 44 can include a heater 43 (see, FIG. 21). In other words, the brewing mechanism can be configured for dispensing single cup quantities of coffee, for example, 12 ounces, 14 ounces, and 16 ounces. Of course a variety of other single cup volumes can be defined; however, the brewing mechanism 40 generally is configured for producing single cup volumes. In contrast, the buffer reservoir 44 is sized and configured for retaining multiple volumes of beverage dispensed from the brewing mechanism 40.

For example, if the maximum volume of beverage that can be brewed and dispensed by the brewing mechanism is 16 ounces, the buffer reservoir 44 may be dimensioned in multiples of 16 ounces. For example, 4, 5 or 6 times the maximum brewing mechanism dispensing volume. This will allow the apparatus to develop a buffer quantity and retain the buffer quantity in the reservoir. This will allow an operator to dispense from the buffer reservoir 44 while the brewing mechanism 40 is operating periodically or generally continuously to produce multiple cycles of beverage and dispensing the beverage into the reservoir 44. Alternatively, the system can be produced with a stand alone brewing system without the buffer reservoir 44. Such a stand alone system could be used for producing quantities of beverage on demand without the option of directing volumes of coffee to the buffer reservoir 44.

The reservoir 44 includes a level detector 41 which is coupled to a controller 47 with the brewing mechanism 40 so that the brewing mechanism 40 does not overtake the maximum capacity of the buffer reservoir. In other words, the brewing mechanism will only initiate a brewing cycle 40 when a buffer reservoir level sensor 41 indicates that it can receive at least a maximum volume of beverage brewed by the brewing mechanism. Likewise, a low level detector 45 is provided in the buffer reservoir to provide a signal to the controller 47 to initiate a brewing cycle if a low level condition satisfies various parameters associated with a programmed brewing cycle and buffer accumulation strategy.

The apparatus can be connected to a pressurized water line or source 50 to provide a continuous flow of water through a control valve 52 to a heated water reservoir 54 of a water delivery system for delivering or dispensing water to the brew column or chamber. The heated water delivery system is coupled to the controller for controllably dispensing water to the column or chamber. The heated water reservoir 54 controllably provides water to the brewing mechanism 40. The heated water reservoir 54 may be sized and dimensioned to provide heated water for brewing cycles on a repeatable, generally continuous basis. A heater 51 is associated with the reservoir 54 to provide heat energy to the water in the reservoir 54

The buffer reservoir 44 also includes a drain control valve 58 which is connected to the controller to controllably drain beverage after a predetermined period of time or other characteristics associated with the beverage. This will allow the system to automatically purge beverage that might be outside of freshness, taste or other parameters. For example, if beverage is allowed to be held within the reservoir for a predetermined period of time, perhaps 20 minutes, the drain valve 58 can be controllably opened by the controller 47 to purge the buffer reservoir. The controller 47 can also monitor the brewing cycles of the brewing mechanism 40 so as to provide a freshness calculation. This may be important to avoid purging freshly brewed coffee after a predetermined period of time from a fresh brewing cycle. However, if a brewing cycle has not occurred within a predetermined period of time the drain valve 58 can be opened on the assumption that no new beverage has been added to the reservoir 44 and any beverage retained in the reservoir 44 may fall outside of the time/freshness limitation parameters.

A first control panel 60 is provided on the apparatus 30. The control panel can include a variety of control buttons, switches or other controls which will allow a user to dispense a single cup of multiple sizes for example at a second control panel 62 or may program the apparatus 30 using control panel 60. Additionally, biometric interfaces such as fingerprint detection, hand detection, or any other biometric detection device may be used. This may be important to prevent unintended operators from controlling or otherwise programming the apparatus 30.

The biometric interface components at the control panel 60 may also be used by customers to identify themselves to the apparatus 30. For example, a customer could walk up to the brewer, place a thumb on the biometric thumbprint sensor whereupon the brewer would dispense a chosen beverage identified with that customer. This of course would require programming to identify the various customers; nevertheless, the programming portion is within the scope of skills of one of ordinary skill in the art based on the teachings of the present disclosure. The programming would allow a user to set a taste profile, choice of brewing substance, temperature as well as other characteristics associated with the customer. The system can be designed to allow the customer to fine tune or refine their own personal recipe and taste preferences over time and save these choices in association with their biometric information. Other forms of interfaces are completely included within the scope of the present application including card base memory systems, RFID, fob retained memory devices such as RFIDs and any form of customer associated interface identification devices currently available or hereinafter developed which can be used in conjunction with the present beverage making apparatus 30.

Figure 6:
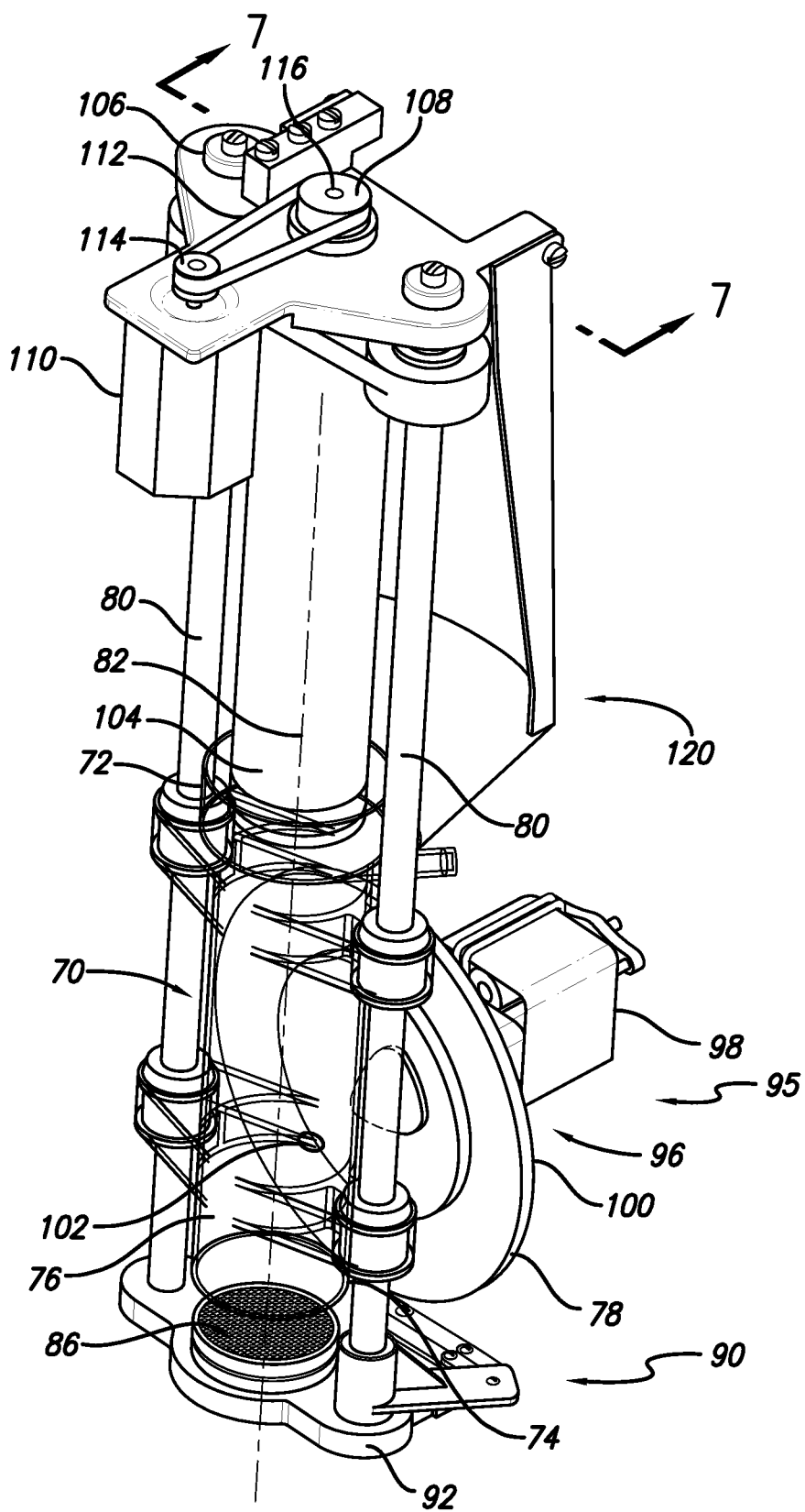
FIG. 6 is a perspective view of the brewing mechanism showing the brew chamber column, column pressurizing piston, guide rails which controllably guide movement of the column, a column driving mechanism including a cam and a drive motor for the driving the cam such that operations of the drive motor drives the cam to controllably move the column upwardly and downwardly along the rails, a motor system for controllably driving the piston generally axially, downwardly along the column, and a brewing substance chute positioned relative to an open mouth of the column for controllably facilitating dispensing of brewing substance into the column during a brewing cycle.

Turning now to provide greater details regarding the brewing mechanism 40, FIGS. 6-20 will be described and discussed. The brewing mechanism 40 as described in prior portions of this disclosure includes an active beverage producing system which pressurizes a volume of water and brewing substance retained in a hollow body in the form of a tube or column or brew chamber 70. With reference to FIG. 6, the brewing mechanism 40 as shown in a "home" or ready position. As shown, the hollow column 70 includes an upper mouth 72 and a lower base 74. A wall 76 extending between and defining the mouth 72 and base 74 include guides 78 depending from the wall 76. The guides are sized and dimensioned for engaging guide rails 80. The pair of spaced apart guide rails 80, 80 help guide the movement of the column 70 along a central axis 82.

At a lower most portion of the mechanism 40 a filter structure 86 is provided on a stationary foundation 92. The base 74 of the column 70 is positioned over and engaged with the filter structure 86 for sealing the base 74. As will be described in greater detail below, a spent brewing substance removal assembly 90 is provided on the foundation 92 generally proximate to the filter 86 also retained on the foundation 92.

Movement of the column 70 is synchronized and controlled by a column driver 95 which includes a cam 96 controllably operated by a drive motor 98. The cam 96 includes cam grooves 100 engaged with corresponding cam follower 102 on the column. The cam follower 102 rides in the cam channel 100 to follow the cam. A piston 104 is attached to an upper portion 106 of the mechanism 40. The upper portion 106 provides a platform for retaining a lead screw 108 which drives the piston 104. Also, a stepper motor 110 is carried on the upper portion 106 and connected to the lead screw 108 by a belt 112 and corresponding gears 114, 116. The stepper motor 110 could also be embodied as a gear motor with the use of position feed back to control the operation of the motor. A coffee directing chute assembly 120 is provided proximate the mouth 72 of the column 70. The chute directs coffee controllably dispensed by hopper drives 97, 99 (see, FIG. 21) from the hoppers 31, 39 into the column 70.

Figure 7:
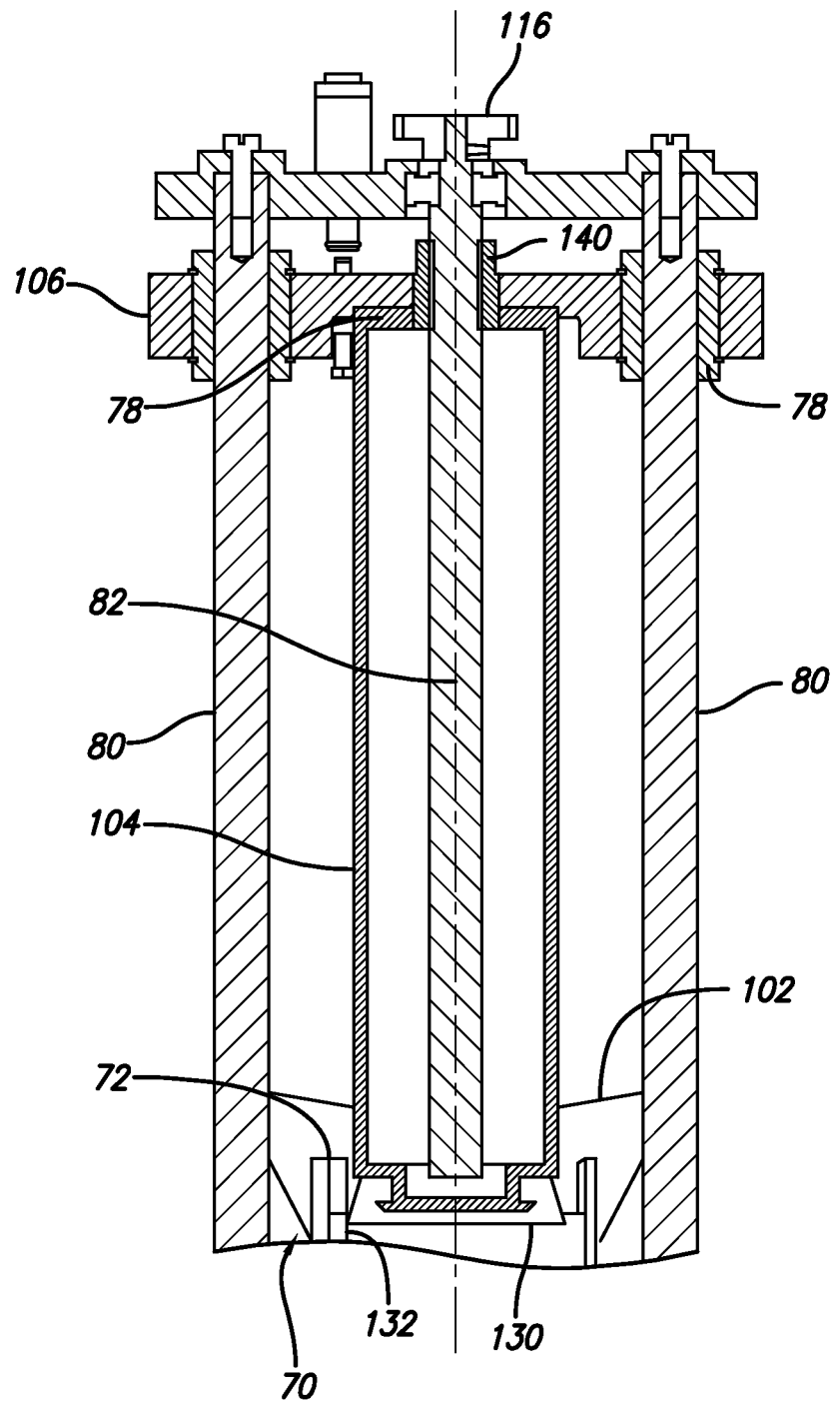
FIG. 7 is a cross sectional view taken along lines 7-7 in FIG. 6 showing the relationship between the various components described in FIG. 6.

With reference to FIG. 7, the piston 104 includes a seal 130 retained on a lower portion thereof for moveable sealing engagement with an inner surface 132 of the column 70. The lead screw 108 driven by the gear 116 engages a corresponding threaded portion 140 of the piston 104 to controllably drive the piston 104 upwardly and downwardly along the central axis 82. As the central axis 82 is parallel to the axis of the corresponding guide rails 80, 80 the moveable components of the mechanism 40 can be operated smoothly and in synchronization provided by the motors 110, 98 which are coupled to the controller. The guides 78, also referred to as trolleys, include bearings which smoothly operate along the guide rails 80, 80.

Turning now to the various progressive positions of the mechanism 40 as shown in FIGS. 8-15. It should be noted that both front elevational views and right side views of these various progressive steps are provided to provide additional information and clarity in this description.

Figure 8:
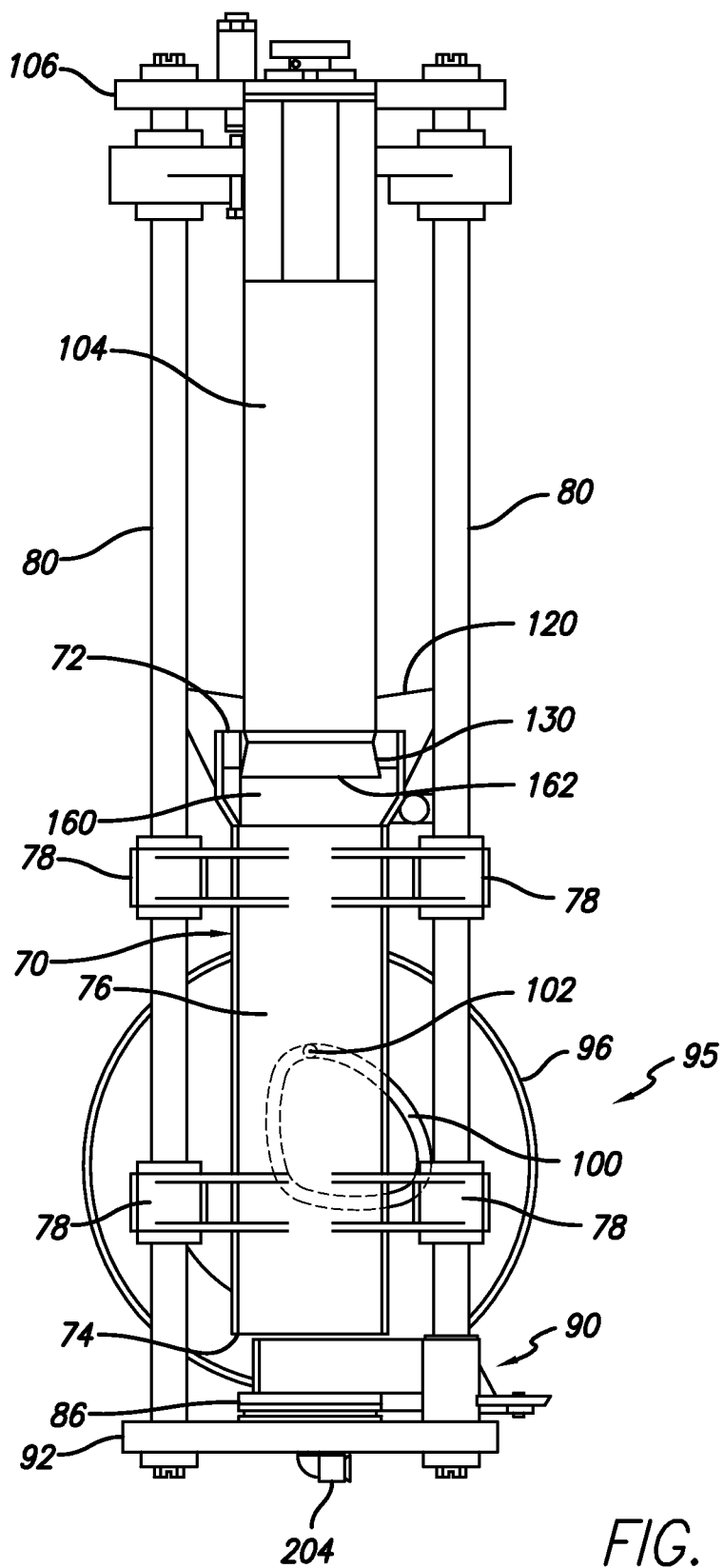
FIG. 8 is a front elevational view of the brewing mechanism shown in FIG. 6 in which the piston, column, and chute positioned in a "home" position prior to alignment for a brewing cycle.
Figure 9:
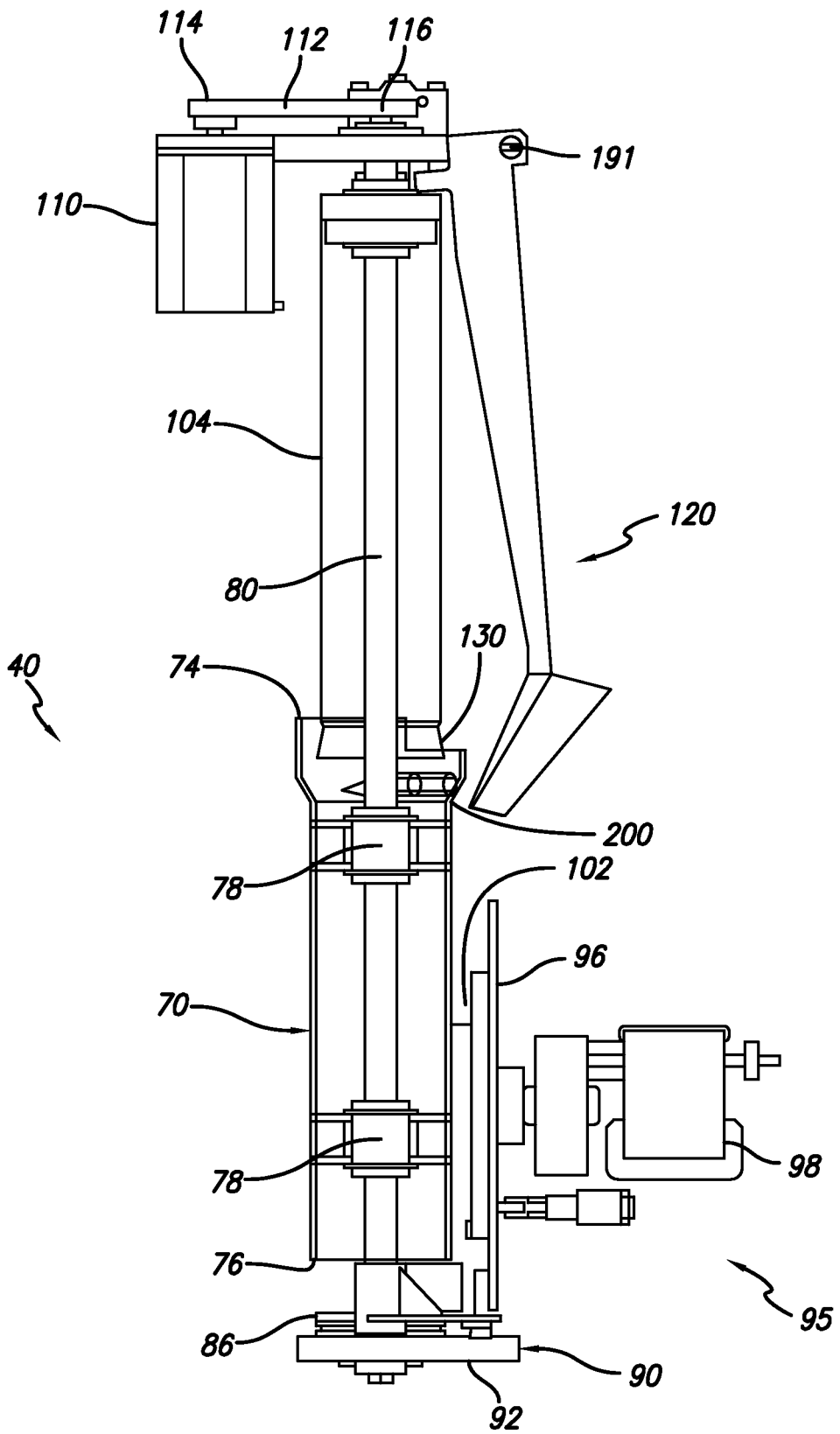
FIG. 9 is a right side view of the brewing mechanism shown in FIG. 8 with the components in the "home" position.
Figure 10:
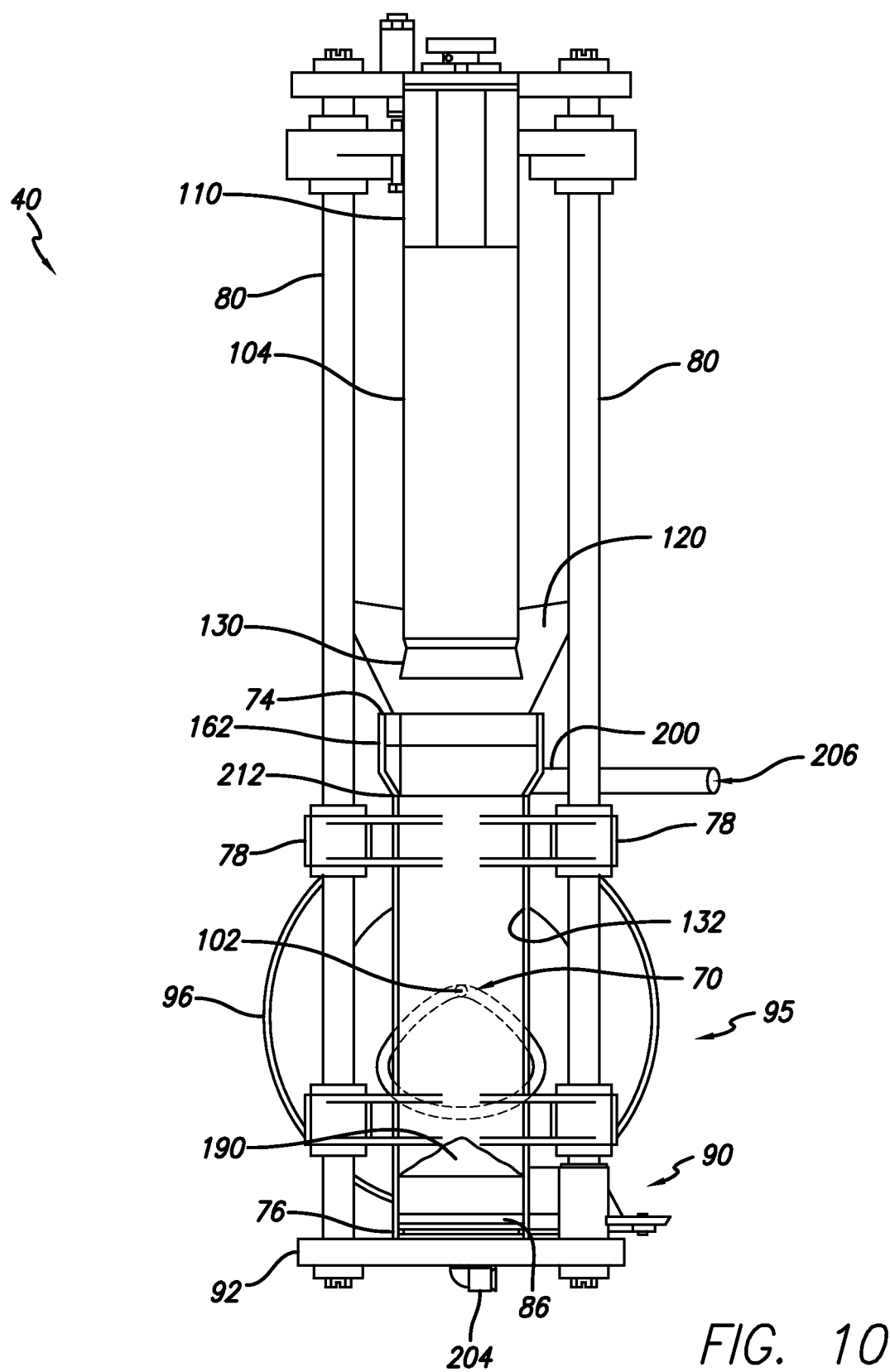
FIG. 10 is a front elevational view of the brewing mechanism as shown in FIG. 6 in which the components have been controllably positioned in a "fill" position for dispensing beverage making substance into the brewing column, the brewing column being downwardly positioned to seal over a filter structure, the piston being driven into the upward most position, and the chute positioned relative to the mouth for dispensing beverage making substance into the column on top of the filter structure.
Figure 11:
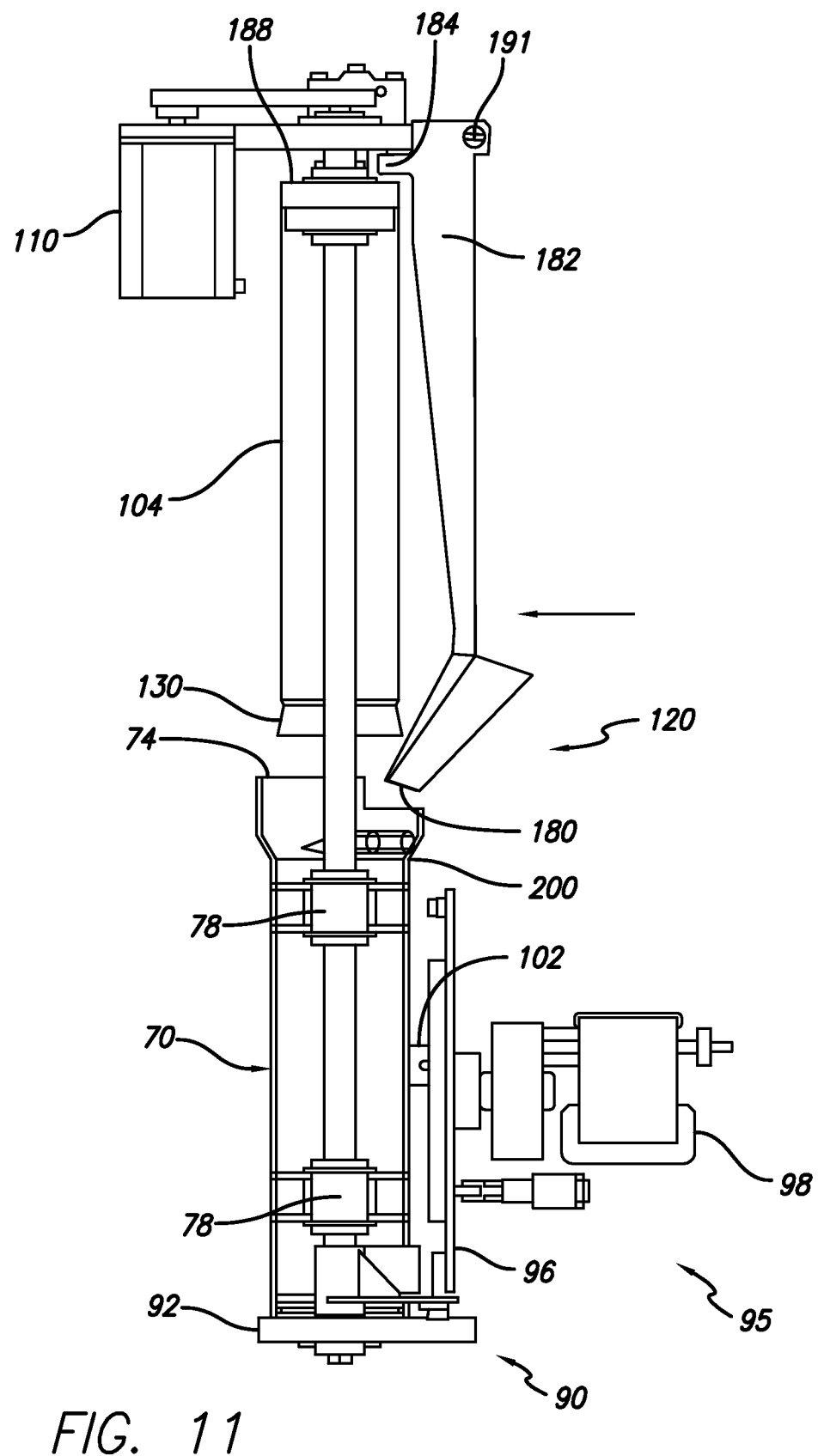
FIG. 11 is a side elevational view of the brewing mechanism as shown in FIG. 10.

As shown in FIGS. 8 and 9, the mechanism 40 is positioned in the "home" position. In the home position the piston 104 and the column 70 are disengaged from each other. Similarly, the column 70 is disengaged from the filter structure 86. Disengagement of these components in the home position helps maintain the life and integrity of the contacts between these components, and helps to maintain air circulation relative to these components. In other words, the seal 130 of the piston 104 is disengaged from the inside surface 132 of the column 70. While the leading edge 160 of the piston 104 is retained in an upper portion 162 of the column 70, the diameter of the upper portion 162 is greater than the diameter of the seal 130 and as such there is no contact. However, positioning of the leading edge 160 in the upper portion 162 helps to align the piston 104 with the column 70 during the brew process.

Also in the home position, the column 70 is raised to disengage the base 74 from the filer structure 86. This helps allow the filter 86 to air to allow drying of the filter structure. This prevents the promotion of any undesirable moisture effects on the filter. With referenced to FIG. 9, the follower 102 or cam follower is engaged with the cam in the upper position.

The components of the brew mechanism 40 are positioned for receiving brewing substance. In this configuration, the column 70 is displaced downwardly to seal the base 74 relative to the filter structure 86. The chute 120 is controllably moved to position a lip 180 of the chute 120 relative to the mouth 72 of the column 70. The chute is retained on arms 182 including a cam or cam follower 184 which, when contacted by the upper portion 188 of the piston 104 causes the arms 182 pivotally retained pivot point 191 to cam inwardly towards the piston 104. The inward movement of the arms 182 and the chute 120 attached thereto causes positioning of the lip 180 relative to the mouth 72. While not shown in detail, coffee hoppers 31, 39 include a drive mechanism which can be coupled to the controller for controllably dispensing a predetermine quantity of coffee to the chute 120. As the augers controllably move coffee from the hoppers 31, 39, coffee is directed down the chute 120 into the column 70. During this process, a volume of coffee 190 is accumulated on top of the filter structure 86 inside the column 70.

During the next step of the brewing process, the piston moves downwardly and heated water is dispensed into the chamber through the heated water line 200. The heated water line is positioned at the upper portion 162 of the column 70. This allows the water to wash the inside surface 132 of the column 70 to rinse any particles or other brewing substance that may have accumulated thereon during the dispensing process. Water will fall through the column and accumulated on top of the brewing substance 190 to initiate the infusion process. Beverage is prevented from dripping through the outlet fitting 204 by use of a low pressure check valve 205 down stream for the fitting 204. The filter structure 86 is generally sized and dimensioned with a sufficiently proportioned opening in the mesh or other filter material to prevent significant drips as a result of gravity. Rather, the brewing process will include the active compression of the water retained in the column to drive the beverage from the combination of brewing substance 190 and water 206.

As the piston 104 is driven downwardly by the motor 110, a cushion of air or air gap 210 (see FIG. 12) is retained in the column. This air gap 210 forms when the volume of water dispensed into the column is slightly less than the maximum volume of the column at the reduced diameter area 212. This air gap 210 will be described in greater detail below.

It should be noted that the outlet fitting 204 directs coffee either to the nozzle 35 or to the buffer reservoir 44 as previously described. The controllable interface 42 allows the mechanism 40 to be quickly and easily removed therefrom for cleaning, maintenance, repair or replacement. One of the advantages of a modular brewing mechanism is that the brewing mechanism can be easily and efficiently replaced to prevent down time of the apparatus 30.

Continuing with the brewing cycle process, the piston continues downward movement along the axis 82 with the guide rails 80 guiding movement of the cylinder 70 by means of the trollies 78. It should also be noted that trollies 78 are provided on the upper portion 188 of the piston 104 to help guide movement of the piston along the axis 82. The active brewing cycle created by movement of the piston approximates a French press type of operation. This system also enhances the controllability of the French press operation to provide more subtlety, control, and recipe tuning.

Figure 12:
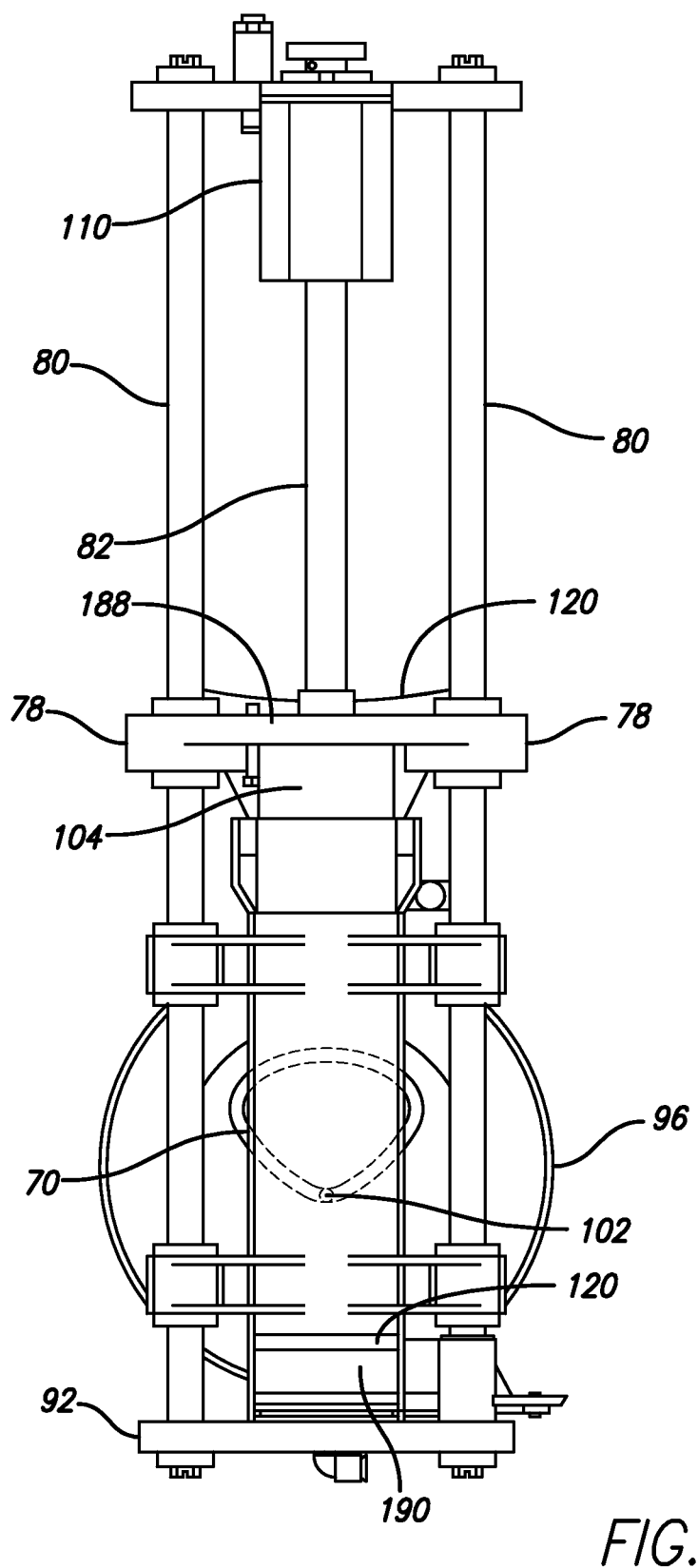
FIG. 12 shows the components in a position during the beverage producing process in which the piston is driven downwardly over water and beverage making substance to pressurize the contents of the cylinder and controllably drive beverage out of the column through the filter structure to provide extraction of beverage from the combination of beverage making substance and water.
Figure 13:
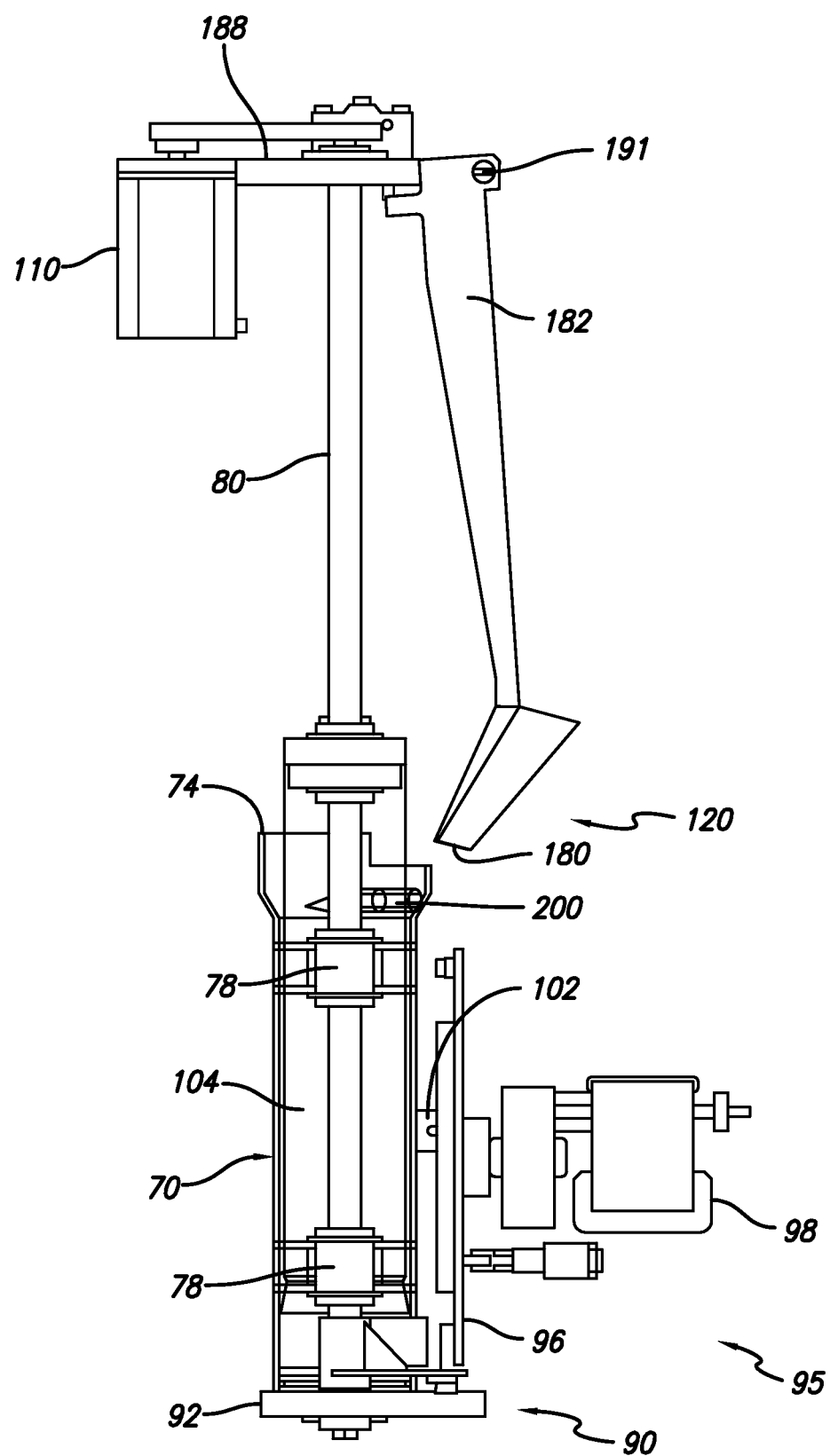
FIG. 13 is a right side elevational view of the mechanism in this progressive brewing step.

With reference to FIGS. 12 and 13, as the piston 104 reaches the bottom of its cycle, the water has been drained from the column 70 and the cushion of air or gap 210 is forced through the brewing substance 190 to flush moisture from the spent grounds. The exhausted or spent brewing substance 190 is somewhat drained or dried as a result of the air passing there through. This helps to make spent brewing substance more manageable.

Figure 14:
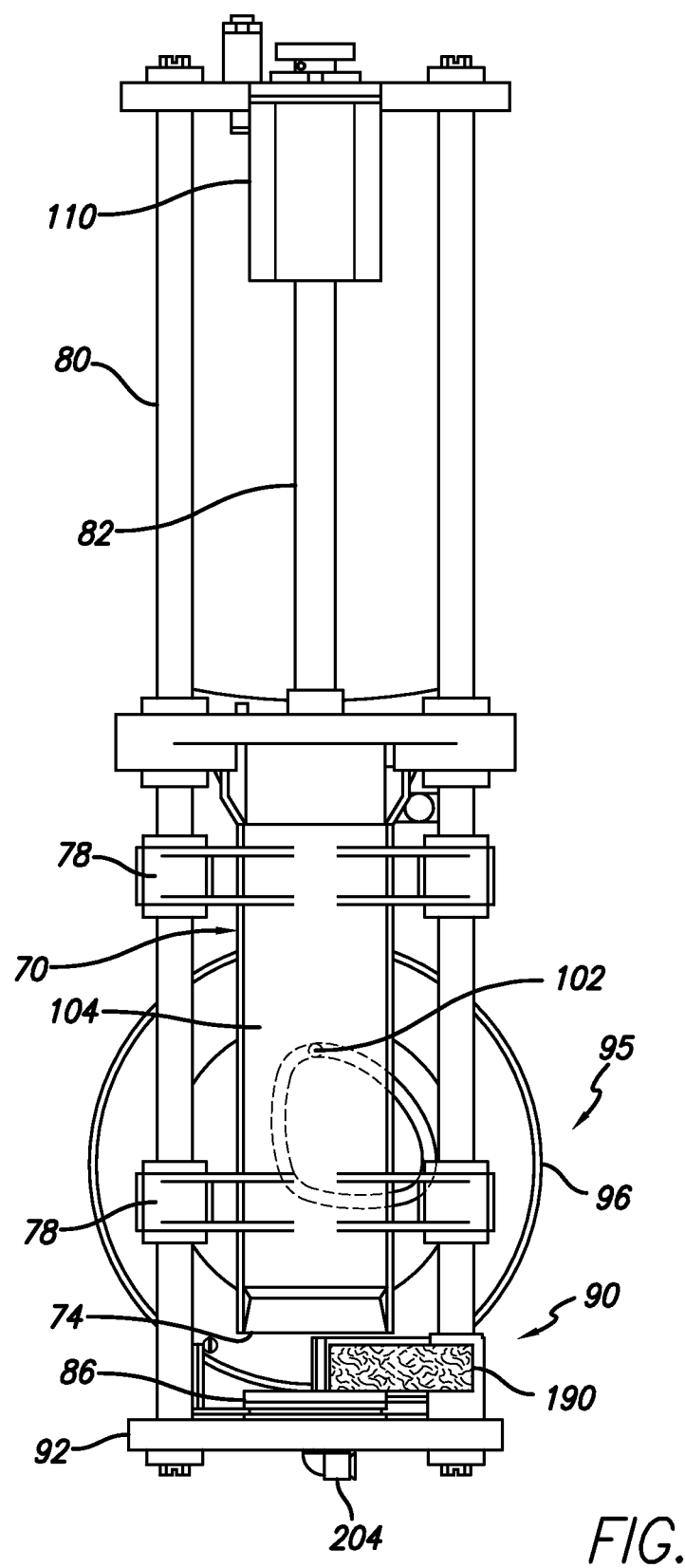
FIG. 14 is a front elevational view of the brewing mechanism showing removal of the spent brewing substance from the filter structure, the piston remaining in the downward position while the column is displaced upwardly by operation of the cam with the column being guided along the rails and traveling upwardly axially relative to the piston.
Figure 15:
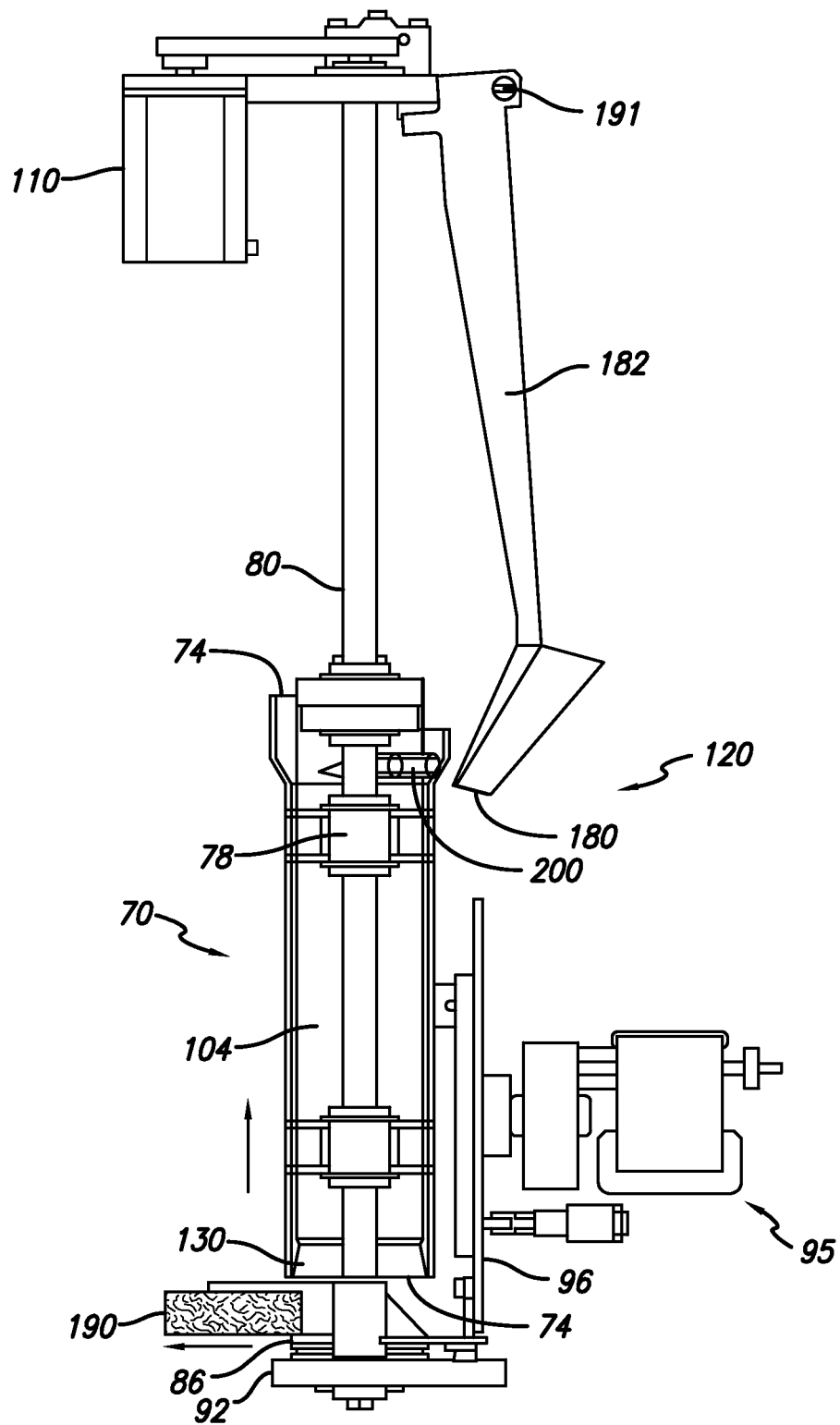
FIG. 15 is a right side elevational view of the progressive step as shown in FIG. 14.
Figure 16:
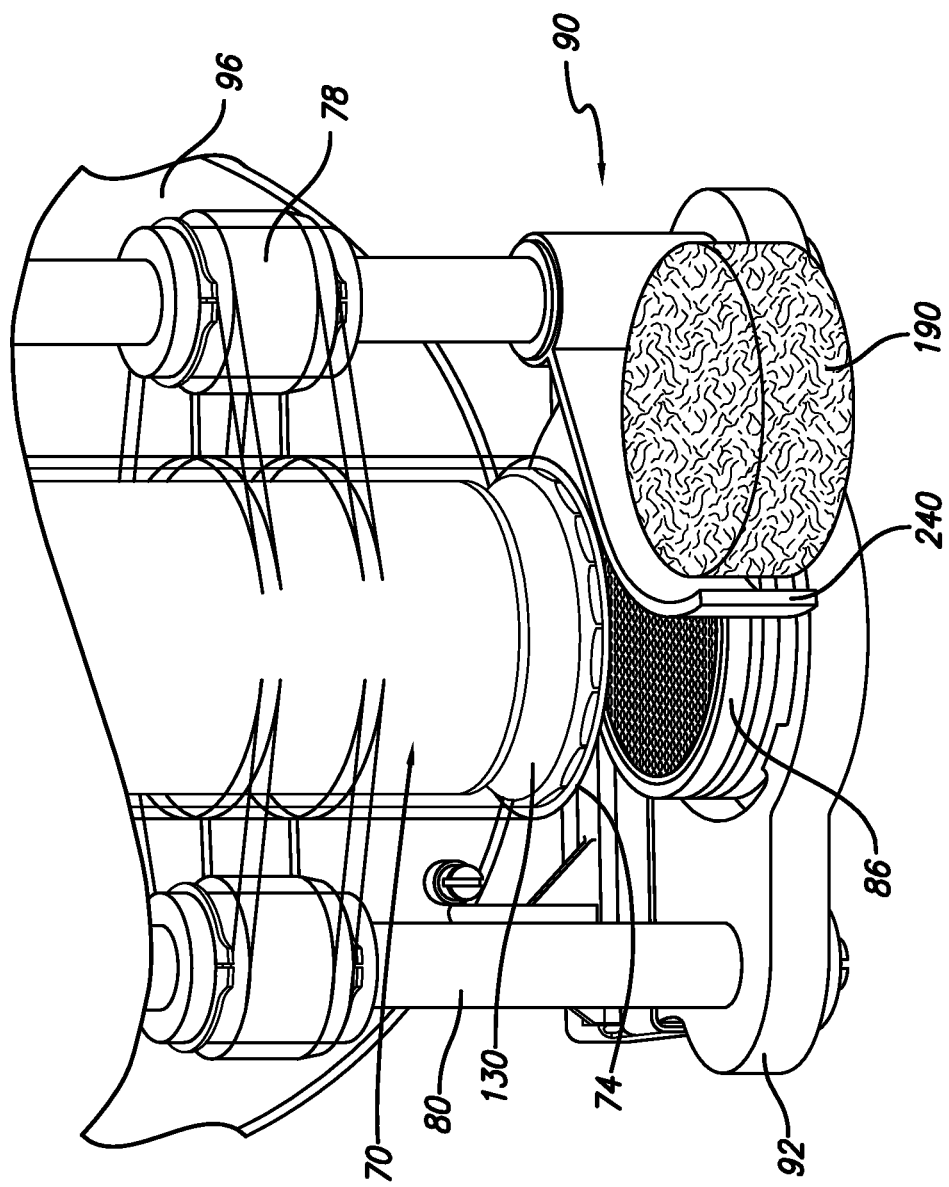
FIGS. 16-19 show enlarged perspective views of the spent beverage making substance being removed from the filter structure, the linkage associated with the controllable arm used to displace the drained and spent beverage making substance from the filter structure, and mechanisms used to actuate the arm during the process of removing the spent and drained beverage making substance.
Figure 17:
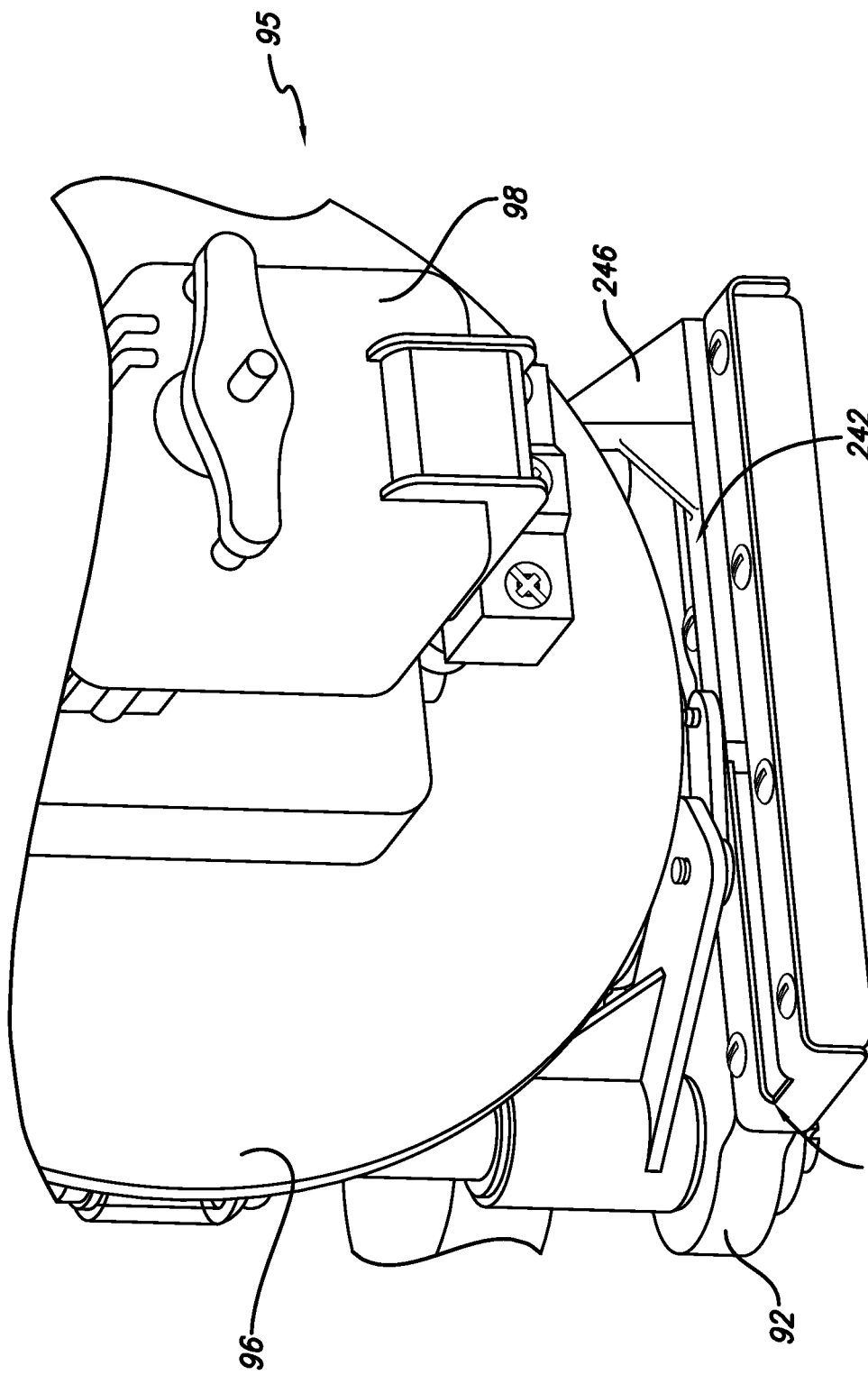
Figure 18:
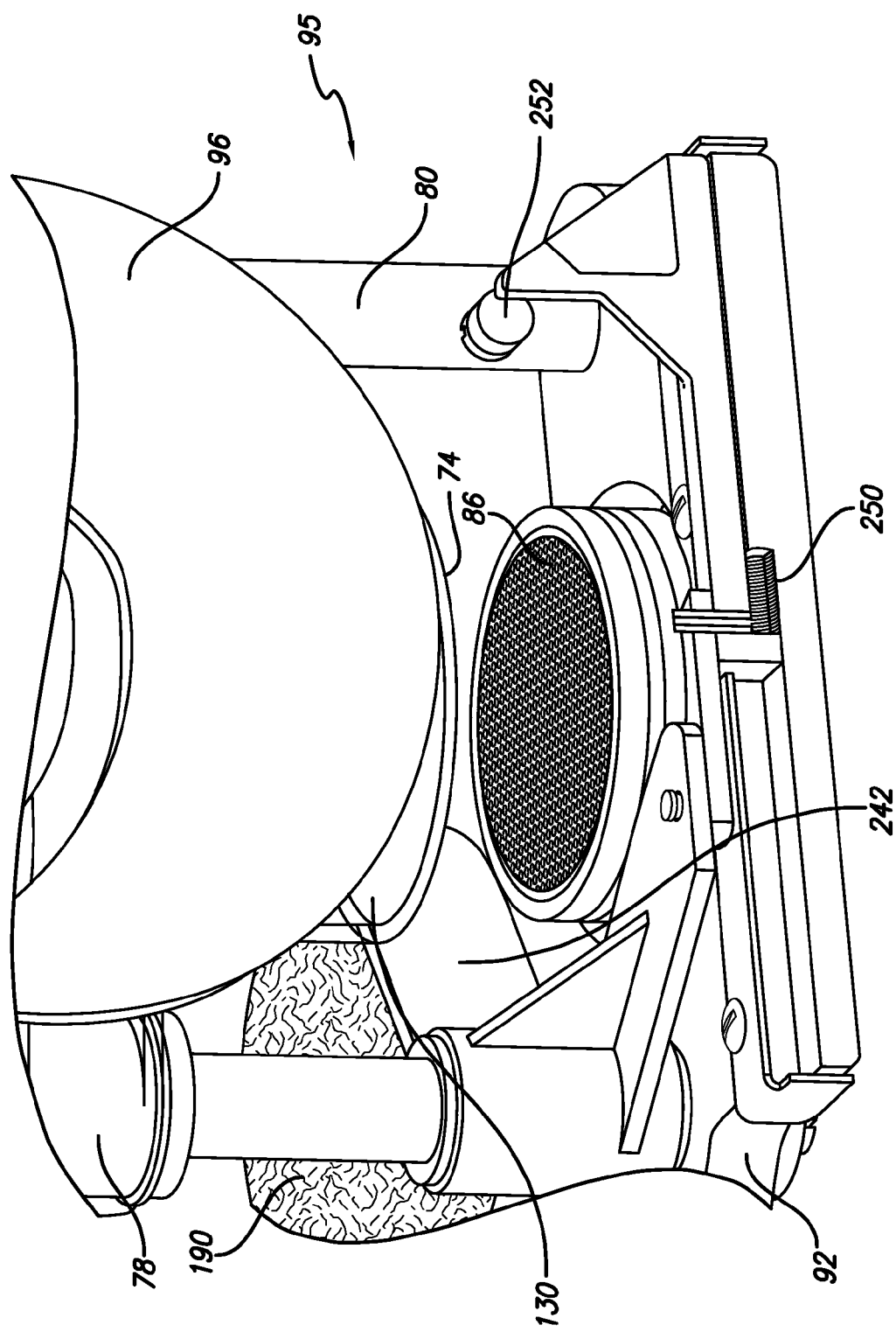
Figure 19:
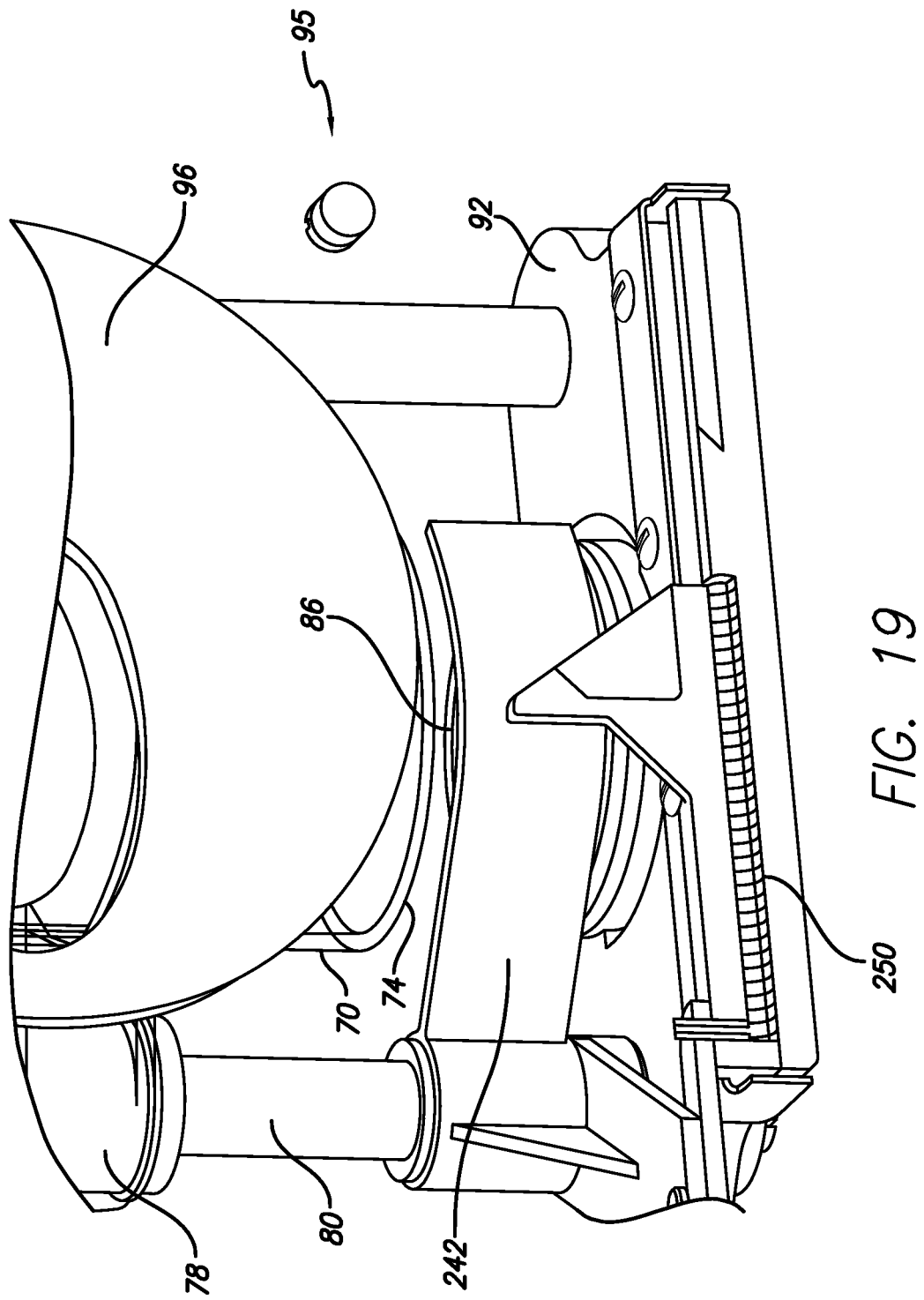
Figure 20:
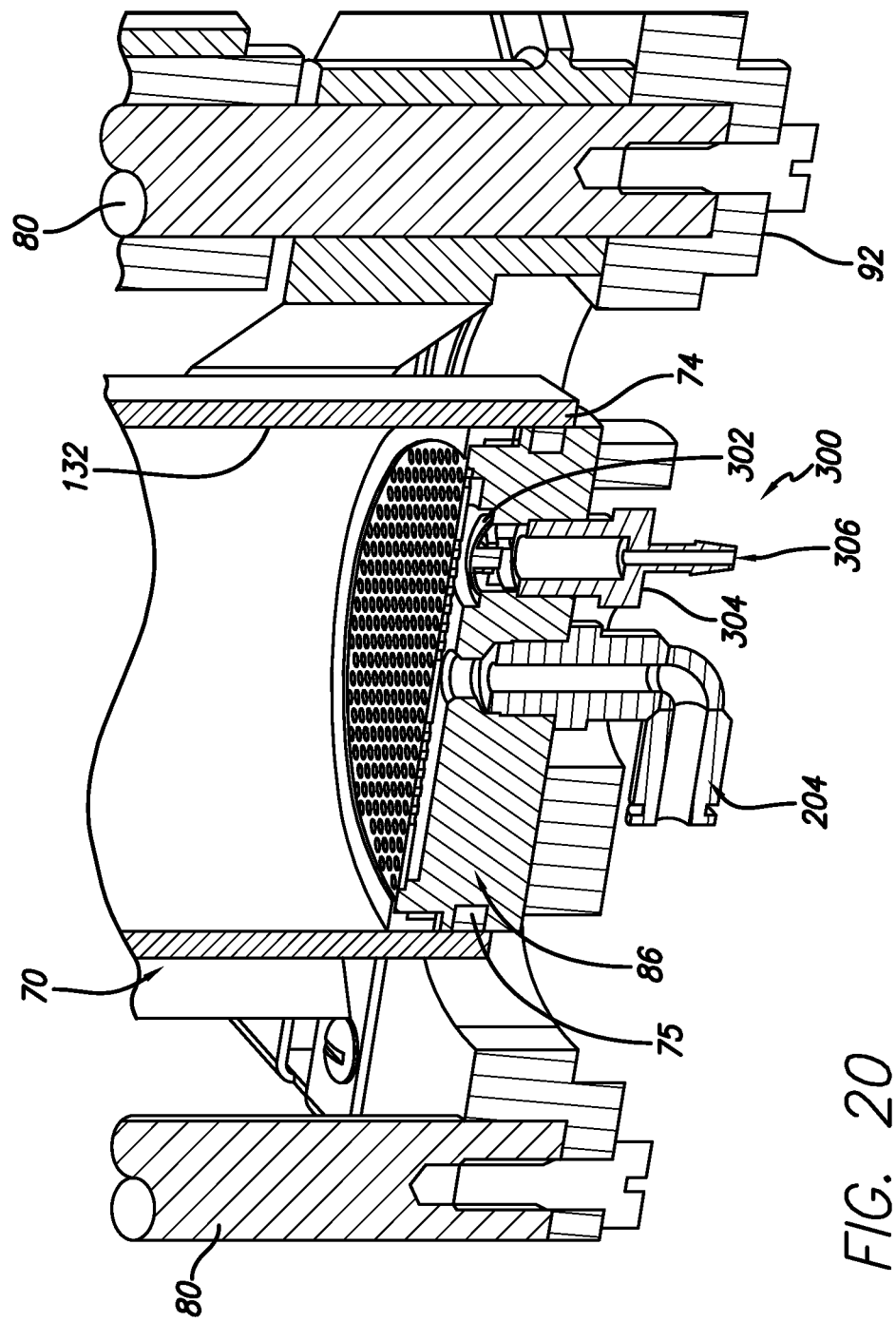
FIG. 20 is an enlarged cross sectional view of the base of the brewer mechanism showing one embodiment of an agitator for agitating the beverage making substance.

After the beverage has been drained from the column 70, the cycle proceeds as shown in FIGS. 14 and 15. The piston generally stops at the base 74 of the column 70. Also, the column 70 is moved upwardly along the axis 82 a sufficient dimension to allow the arm mechanism 90 to controllably operate for subsequent removal of the spent brewing substance from the filter structure 86. It should be noted that the spent brewing substance 190 in its somewhat dried state, is more manageable and can be controlled for removal from the brewing mechanism. The removal mechanism 90 displaces a puck of brewing substance from the brewing mechanism 40 to the grounds tray or bin 101. After the spent grounds 190 have been removed, the piston and column cycle to return to the home position as shown in FIGS. 8 and 9.

Operation of the puck removal is described in greater detail with reference to FIGS. 16-19. The puck removing mechanism 90 includes an arm 240 which is connected to actuation mechanism 242. Operation of the actuation mechanism 242 acts to move or rotate the arm 40 to displace the puck from the filter structure 86. In other words, the arms 240 acts to flip or scrape the puck 190 away from the filter structure 86.

The arm moving mechanism includes a follower extension 246 which travels along a channel to 248. The follower mechanism 246 is coupled to a spring 250 which acts to return the follower mechanism after the associated cam lug 252 carried on the cam 96 moves out of position. As such, the arm 240 is out of position behind the column during the home position and brewing process as described above. After the brewing process is complete and the piston 104 and column 70 move upwardly away from the filter structure 86, the arm 240 rotates in position across the filter structure to flip the puck 190 away from the filter structure 86. The spring mechanism 250 causes the arm to retract after movement of the follower 246 is completed.

Disclosed in FIGS. 23-35 is an alternate embodiment of the system, apparatus, and method as disclosed in corresponding FIGS. 1-20. FIGS. 1-4 and FIG. 21 as described above generally relate the alternate embodiment shown in FIGS. 23-35. In the embodiment shown in FIGS. 5-20, the brewing mechanism 40 includes a piston which moves downwardly. In the alternate embodiment of FIGS. 22-35, many of the same control features directly apply. Similarly, in the alternate embodiment the brewing mechanism can produce brewed beverage by single cup or to a reservoir. In the alternate embodiment, however, the piston moves upwardly.

Common to both embodiments is the use of a brewing mechanism for use in brewing a single cup or in brewing multiple batches to a reservoir. Similarly, air agitation is provided in the brewing chamber to agitate the beverage brewing substance to produce a desired result. In the brewing mechanism, ground brewing substance is combined with water and drained through a filter mechanism to produce a brewed beverage. As described in the embodiment in FIGS. 5-20 as well as the embodiment in FIGS. 22-35 characteristics of the brewed beverage can be controlled to achieve a desired result.

Figure 21:
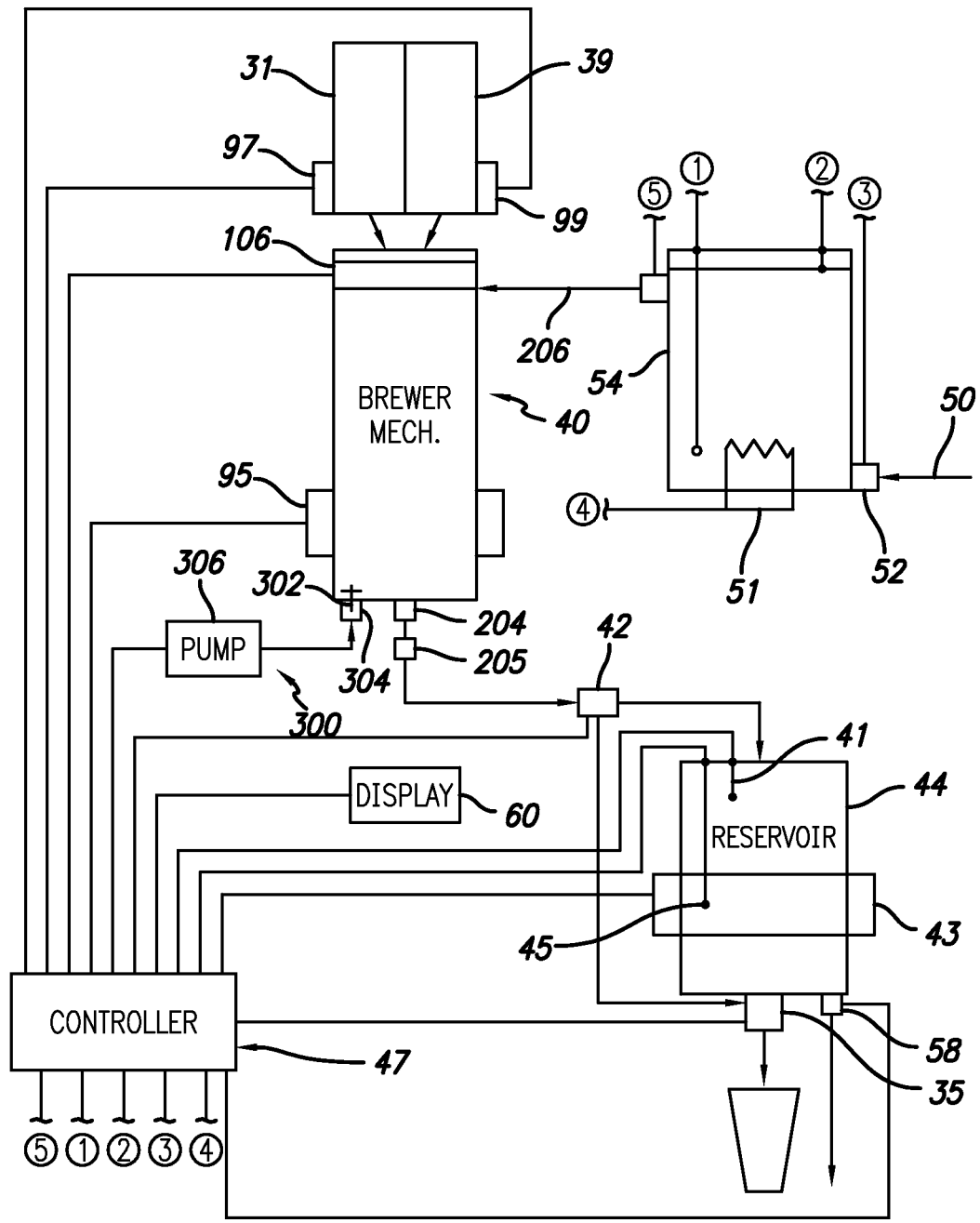
FIG. 21 is a diagrammatic illustration of the system showing the couplings, connections, and relationships between various components of the system.
Figure 22:
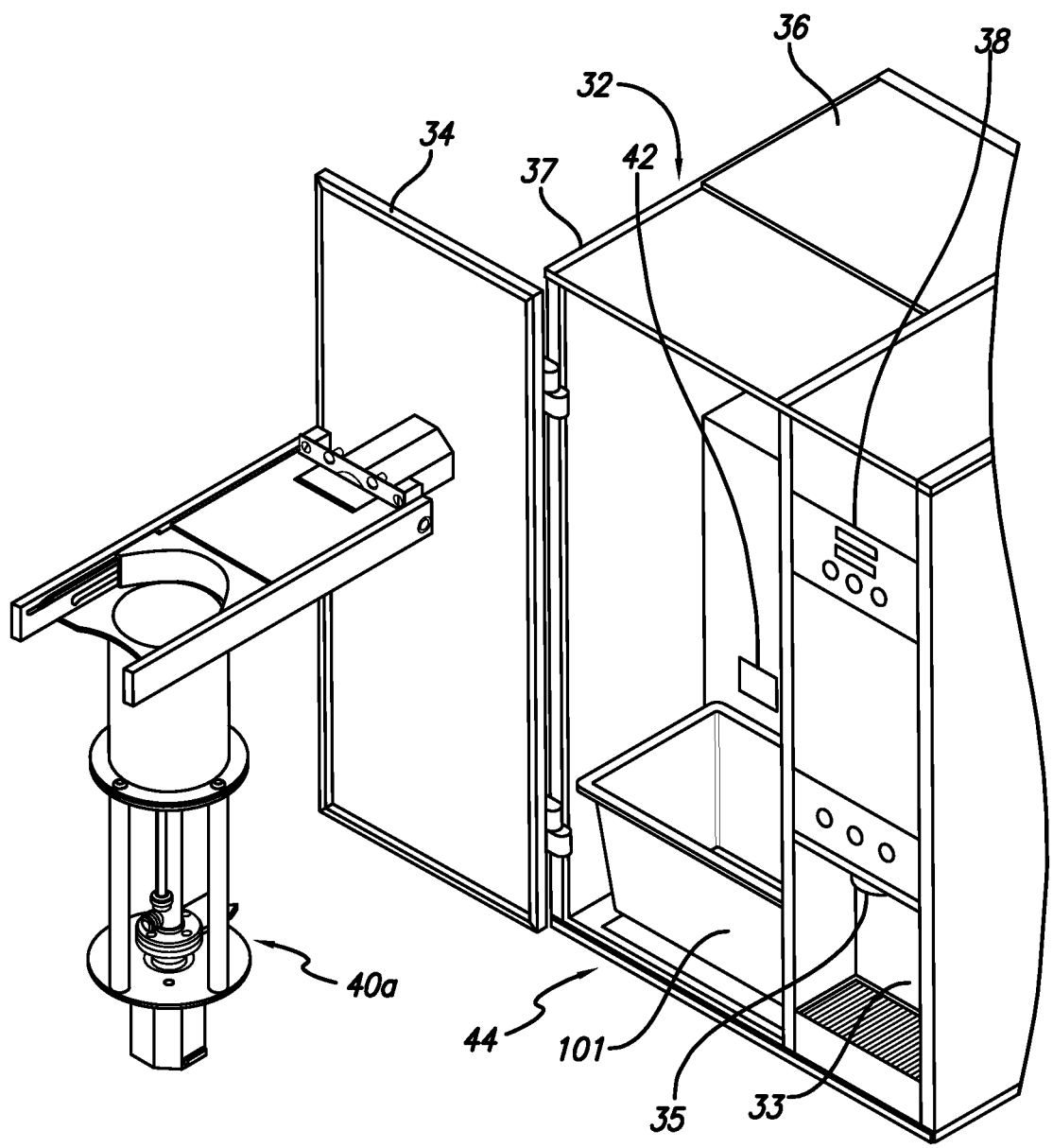
FIG. 22 shows the beverage producing apparatus of FIG. 1 in which an alternate brewing mechanism has been removed from the cabinet, the general information relating to FIGS. 1-4 generally applying to this alternate embodiment as shown in FIG. 22.

The diagrammatic illustration of FIG. 21 applies to both embodiments with the brewing mechanism shown therein construed to be either the application of the embodiment shown in FIGS. 5-20 or the embodiment shown in FIG. 22-35. In either scenario, the brewing mechanism will ultimately produce a brewed beverage which is dispensed through a passage to a dispensing assembly 42. Similarly, the agitating assembly 300 is common to both such that air can be introduced into the brewing mechanism to agitate the brewing substance during a brew cycle. Similarly, the hoppers 31, 39 and the dispensing mechanism 97, 99 can be used to controllably dispense brewing substance into the brewing mechanism. Additionally, the heated water reservoir is controllably operated by the controller 47 to controllably dispense heated water through 206 to the brewing mechanism in both embodiments.

Figures 23, 24:
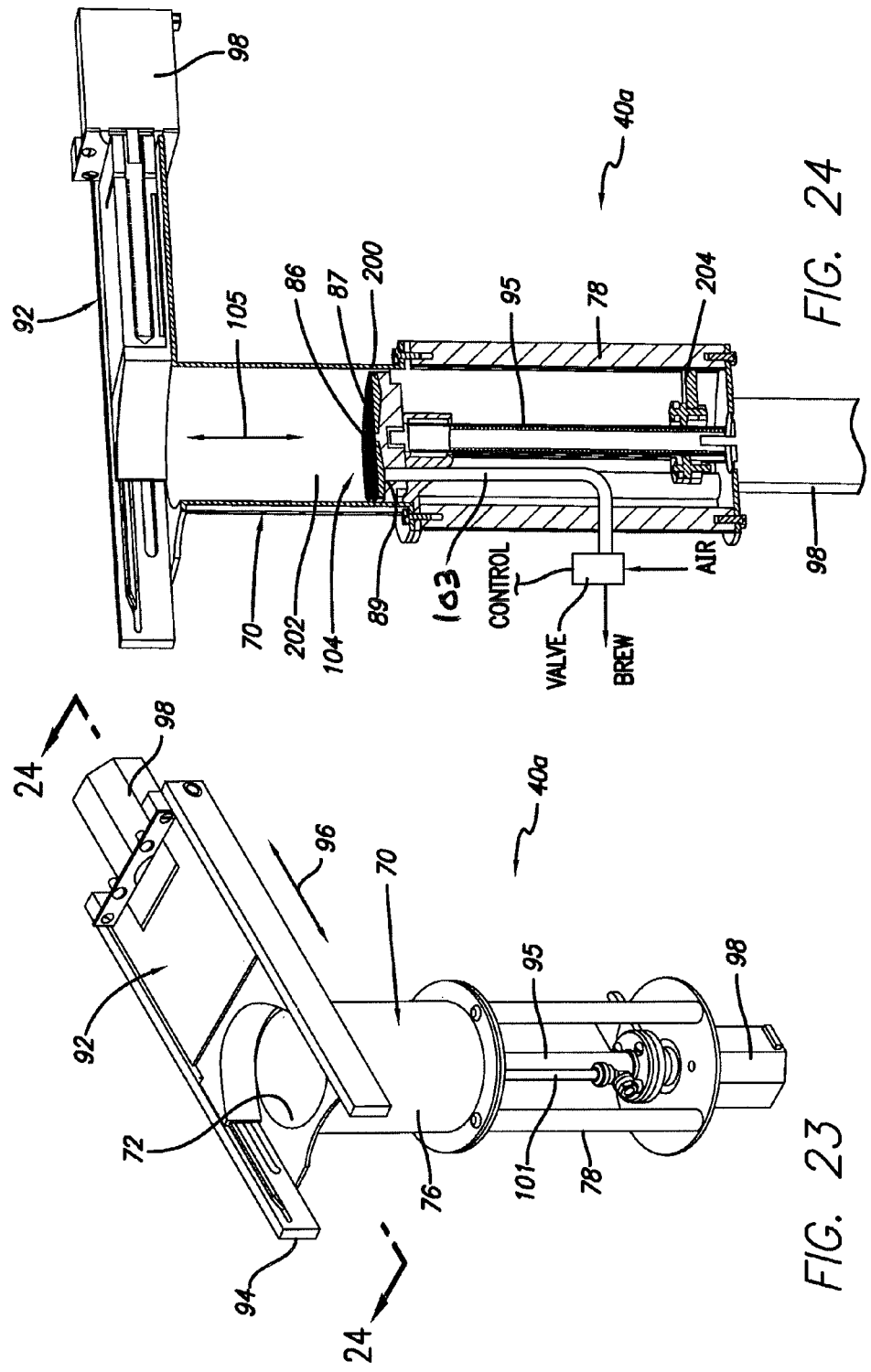
FIG. 23 is a perspective view of the brewing mechanism showing the brew chamber, operating shaft and motor, cover assembly which are all operative to controllably produce and dispense a beverage.
FIG. 24 is a cross sectional view taken along lines 24-24 in FIG. 23 showing the relationship between the various components described in FIG. 23.
Figure 25:
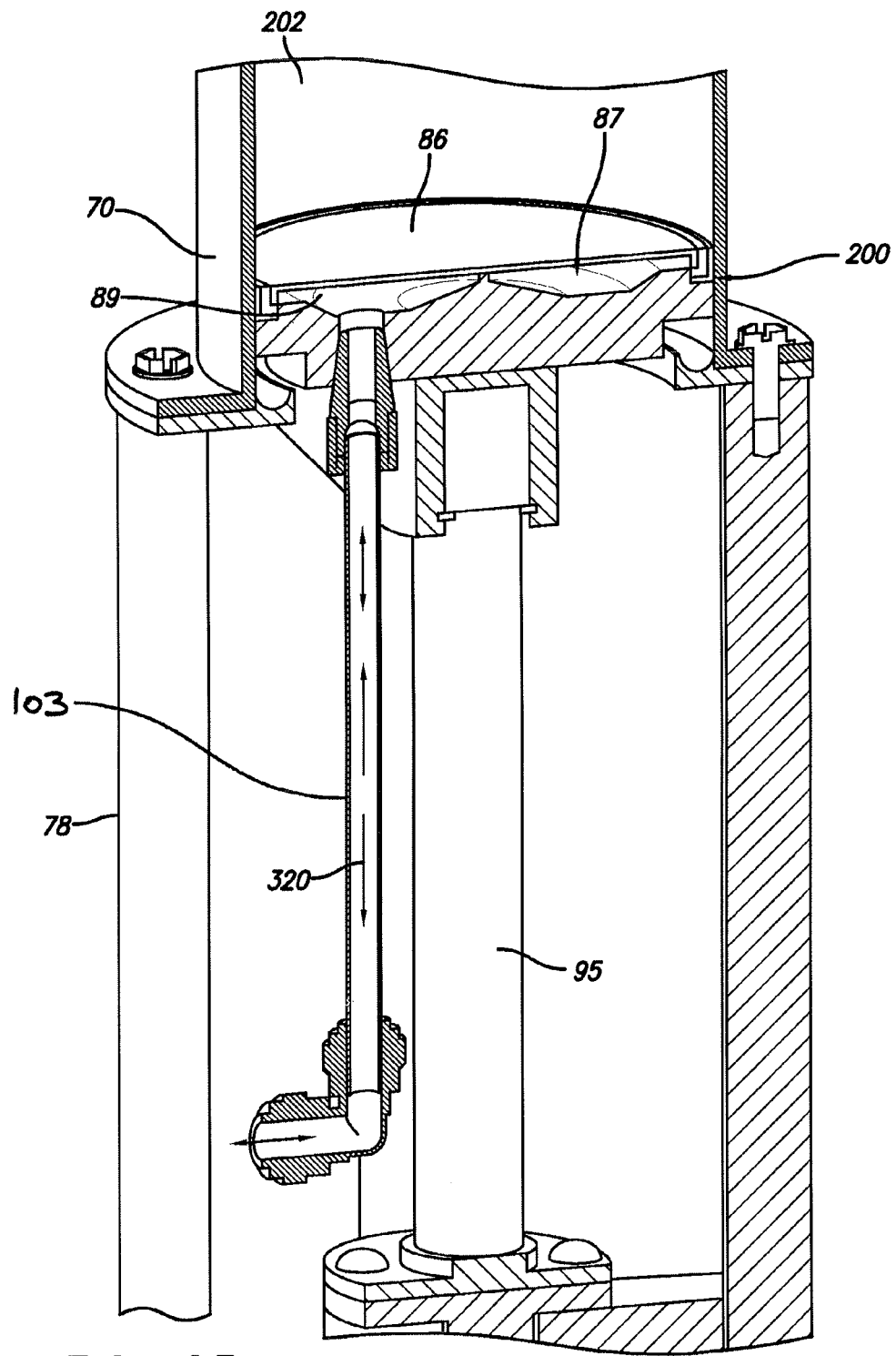
FIG. 25 is an enlarged cross sectional view based on the view as shown in FIG. 24 further showing a filter carried on the piston and an outlet tube operatively coupled and in communication with a recessed area proximate to filter for dispensing brewed beverage from the chamber.

Turning now to provide greater details regarding the brewing mechanism 40, FIGS. 22-35 will be described and discussed. The brewing mechanism 40 as described in prior portions of this disclosure includes an active beverage producing system which pressurizes a volume of water and brewing substance retained in a hollow body in the form of a column or brew chamber 70. With reference to FIGS. 23-25 the brewing mechanism 40 as shown in a "home" or ready position. As shown, the hollow column 70 includes an upper mouth 72 and a lower base 74. A wall 76 extending between and defining the mouth 72 and base 74 is supported on spacers 78. The spacers provide a dimensional separation between a motor 98 and a connected piston shaft 95. The brewing mechanism 40 can be used with an apparatus such as shown in FIGS. 1-4. Alternatively, this brewing mechanism 40 can be configured in a number of other embodiments. For example, the brewing mechanism 40 could be placed in stand alone system which is operated by a barista similar to that as might be achieved by using an espresso machine. Regardless of this specific embodiment in which the brewing mechanism 40 is placed, further discussion with regard to the structures and functions of this mechanism will be described below.

An uppermost portion of the mechanism 40 includes a cover assembly 92 which is displaceably carried on guide rails 94 for generally axial movement 96 by means of a motor 98. The cover assembly 92 will be described in greater detail below with regard to FIGS. 30-34. The cover assembly 92 helps to cover the opening 72 of the brew chamber 70 during the brewing process. Additionally, the cover assembly is operated so as to undercover the brew chamber at the conclusion of the brewing process and displace the generally drained, spent quantity of compressed brewing substance by sliding or shifting relative to the rails 94 by operation of the motor 98.

With further reference to FIG. 24 a piston 104 is operatively attached to the drive shaft 95 and is axially displaceable 105 within the hollow cavity of the column 70. The piston moves axially upwardly and downwardly 105 during the brewing cycle. The piston 104 includes a filter structure 86 carried proximate a face 87 of the piston 104. One or more recesses 89 are formed in the face 87 of the piston 104 with the filter structure 86 overlying the recesses. An outlet tube 103 is operatively coupled and in communication with the recesses 89 to provide a path through which brewed beverage will flow.

The motor 98 operates a lead screw 95 to vertically displace the piston 104 attached to the lead screw 95 upwardly and downwardly through the chamber. A seal 200 on the piston 104 helps to seal the piston against the inside surface 202 of the brew chamber. An anti-rotation bracket 204 is provided to produce vertical displacement 105 of the piston 104 in the brew chamber. As shown in FIG. 24, the brew chamber with the piston in the bottom most position is ready for receipt of ground coffee and hot brewing water in order to produce a brewed beverage.

Turning to FIG. 25, an enlarged cross sectional view of the lower portion of the brew chamber and piston is shown. As shown in FIG. 25, recesses 89 are provided in the face 87 of the piston to provide a collection cavity for a beverage which is forced through the filter 86. Beverage which collects in the recesses is drained through the outlet tube 101. The outlet tube is attached to the lower portion of the piston and travels upwardly and downwardly with the piston as it is driven by the lead screw 95. The upward force of the piston against the cover 92 result in pressurizing of the contents of the chamber thereby creating a pressurized displacement of beverage through the filter and out through the outlet tube.

Figure 26:
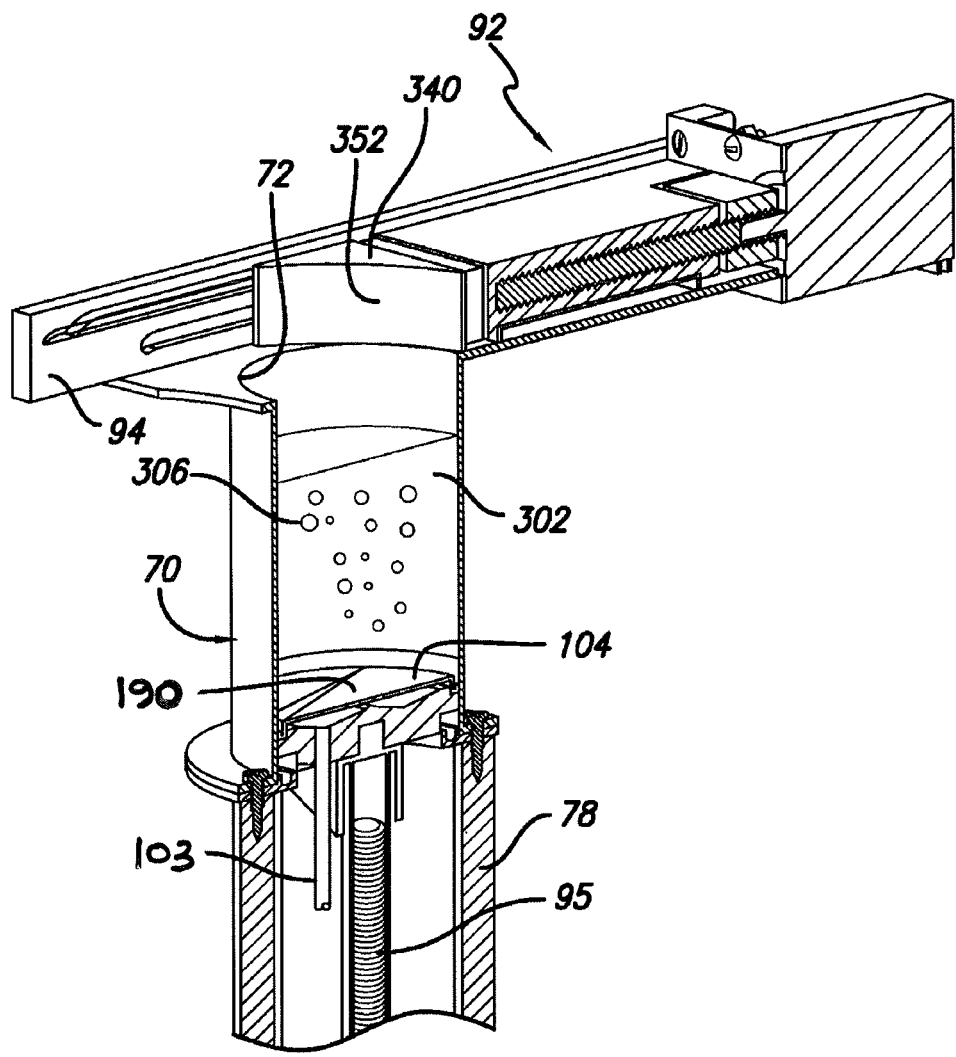
FIG. 26 is a cross sectional perspective view showing the first step of a brewing cycle in which a beverage brewing substance is disposed in the chamber and in which heated water is added to agitate the slurry substance retained in the chamber.

As shown in FIG. 26, a quantity of beverage brewing substance 190 is shown placed on top of the piston 104 and heated water 302 has been placed in the brew chamber for combination with the brewing substance 190. The coffee and water may be added by mechanized dispensing systems such as the hoppers and a water delivery system or water systems for dispensing these ingredients. Additionally, if the brewing mechanism 40 is used as a stand alone mechanism without the additional automatically controlled features, an operator can place a desired quantity of brewing substance and water into a brew chamber manually.

Air 306 is may be injected into the brew chamber either through the outlet tube by way of operation of a control valve which can switch between allowing air to be moved into the chamber or brew dispensed or by way of a separate air introduction line. Air can be introduced into the recesses underneath the filter so as to force the air up through the filter. Delivery of air through the filter helps to agitate or otherwise mix the beverage brewing substance with the water retained in the chamber. This agitation helps to enhance the brewing characteristics of the coffee or other beverage.

Figure 27:
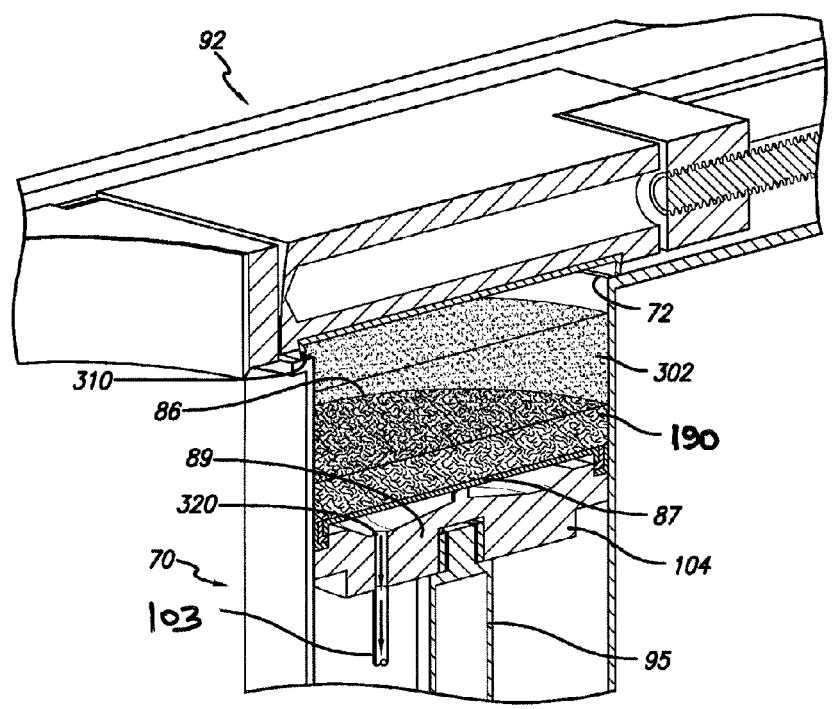
FIG. 27 is an enlarged perspective view of the assembly during a dispense portion or dispense stage of the brewing cycle with a cover positioned over the chamber and the piston moving upwardly through the chamber to drive brewed beverage through the filter and through the outlet tube.

Generally, the introduction of air and air agitation is accomplished with the cover displaced or substantially displaced away from the opening of the chamber. This allows additional or excess air to escape from the chamber and controlled to build up of pressure within the chamber. After sufficient time of steeping, agitation, or both, the cover assembly shifts to cover the mouth of the brew chamber. As shown in FIG. 27, a seal 310 is positioned to cooperatively seal a rim or mouth 72 of the chamber. This seals the brew chamber during the ongoing brewing operation.

With a seal brew chamber, the piston is upwardly shifted 105 thereby compressing the trapped air 312 between the seal 310 and the water 302. The brewing substance 190 will tend to settle during this stage of the brewing cycle. Continued upward movement of the piston 104 drives the brewed beverage 320 through the outlet tube 101. Continued upward movement after significant draining of the beverage through the filter results in enforcing the air 312 through the (now spent beverage brewing substance 190 to help drain moisture from the brewing substance). Draining of moisture from the brewing substance helps to make the substance more manageable at the end of the brewing cycle. Additionally, forcing some volume of air 312 through the outlet tube 101 helps to promote clearing and draining of the tube 101.

Figure 28:
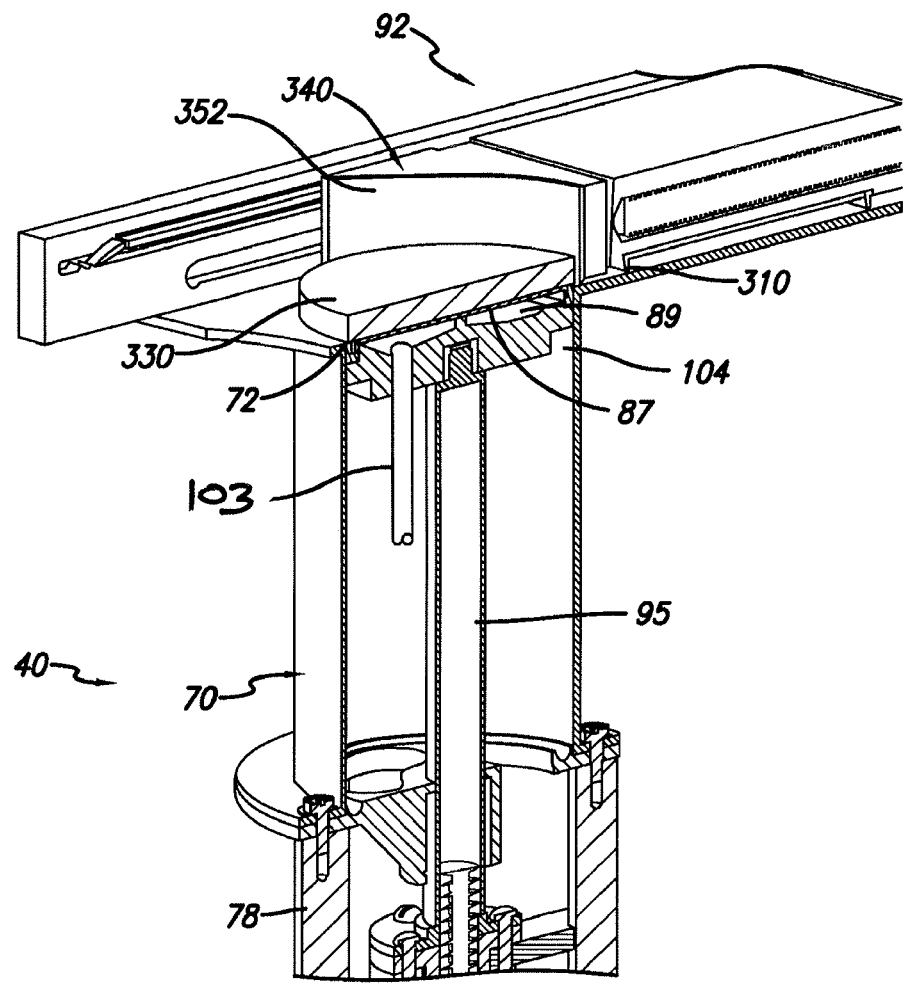
FIG. 28 is a similar view of the assembly in which the brewing cycles complete, the piston has pressed liquid out of the spent grounds and the grounds are upwardly presented by the piston for removal by the cover trolley.

With reference to FIG. 28, the piston continues its upward travel to displace the spent brewing substance 330 beyond the rim 72 of the brewing chamber. This position is achieved by displacement of the cover assembly away from the mouth of the chamber after the end of the brew cycle. By displacing the cover assembly away from the brew chamber a leading edge on the cover assembly including the wiper 340 is positioned to help facilitate removal of the spent brewing substance 330.

Figure 29:
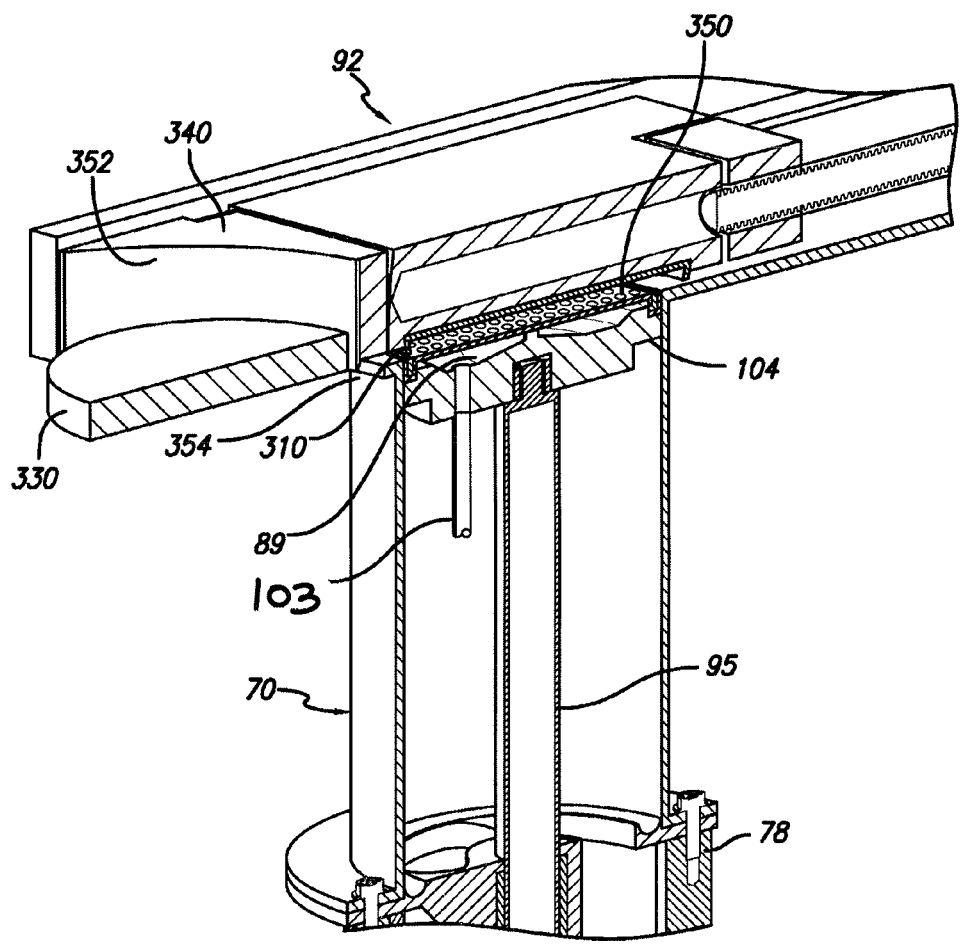
FIG. 29 is a perspective view similar to that as shown in FIG. 26 in which the cover trolley has advanced forwardly to push the spent and drained coffee from the piston for disposal thereof.

With regard to FIG. 29, the cover assembly is translated generally linearly over the chamber thereby engaging the wiper with the spent brewing substance and displacing it from the top of the piston. This also helps to facilitate wiping of the top surface 350 of the piston 104. Wiping is accomplished by a squeegee structure 352 carried on the wiper 340. A leading edge of the squeegee material 354 extends down sufficiently so as to create a wiping action to clean the surface 350 of the filter.

Figure 30:
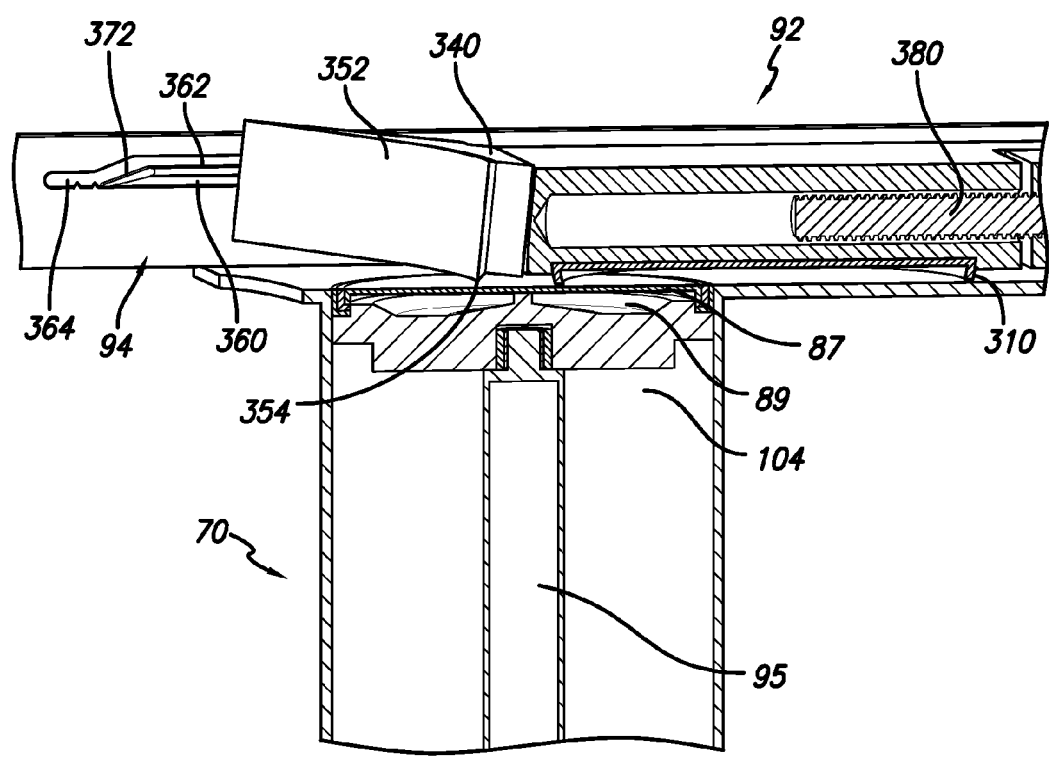
FIG. 30 is a view of the trolley as it is advancing forwardly (with the spent grounds removed therefrom) to illustrate the movement of a scraper portion on the leading edge of the trolley and associated structures which help to agitate, shake or otherwise move this portion to help dislodge spent grounds from the scraper.
Figure 32:
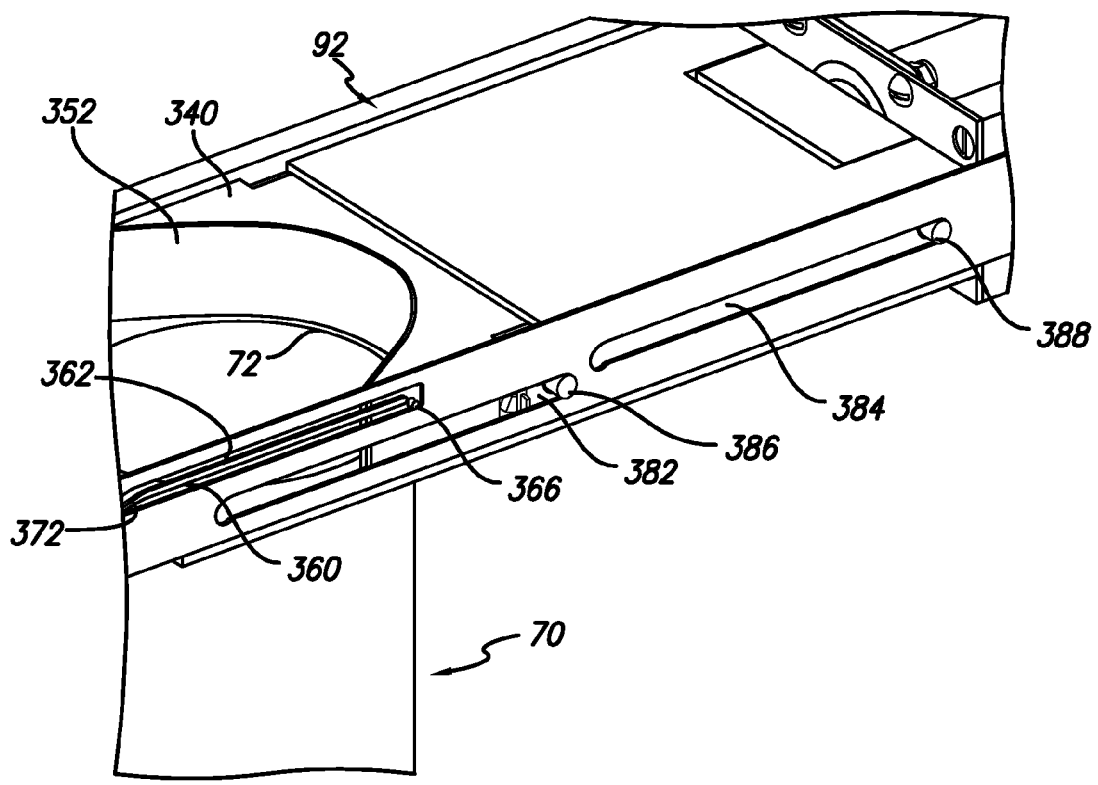
FIG. 32 is an enlarged detailed view of the trolley assembly and associated guide rail structures which help facilitate movement of the leading edge of the trolley.
Figure 33:
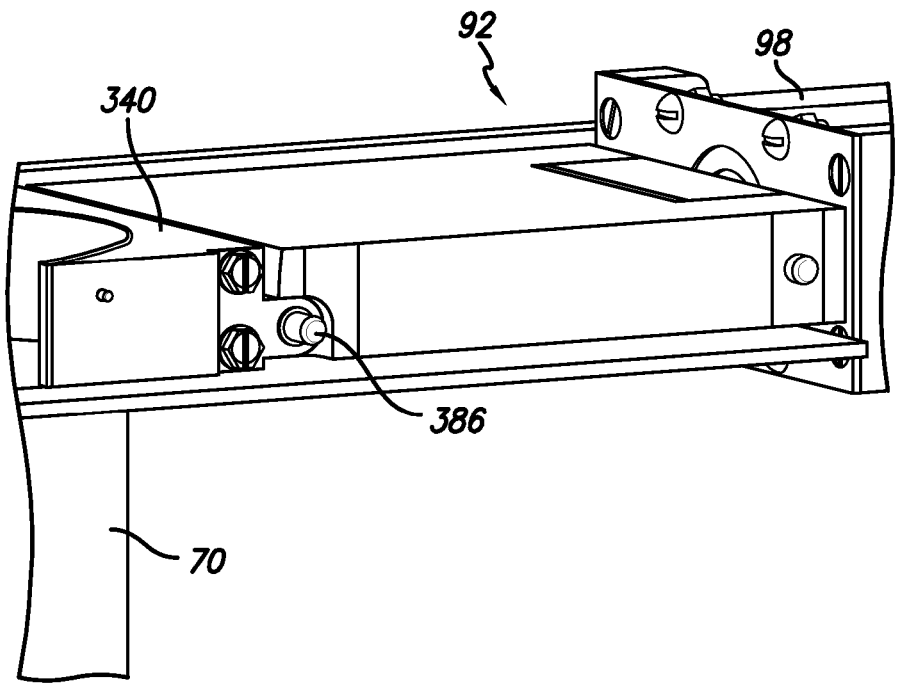
FIG. 33 is an enlarged view showing additional structures on the trolley.

As shown in FIG. 30, the guide rails 94 include removal channels 360 and return channels 362. The rails 94 are mere images of each other and as such only one will be described with reference to FIG. 30. The removal channel 60 includes a series of shaker bumps or structures 364. As shown in FIG. 32, a guide pin 366 is provided on the wiper 340. The guide pin travels in the channels 360, 362 to provide action on the wiper 340.

During the removal step in which the wiper displaces the spent brewing substance from the piston, the pins 366 guide the wiper along the removal channel 360. It should be noted that there is a hinged structure 370 attaching the wiper 340 to the cover assembly. This allows of hinged movement of the wiper 340 relative to the cover assembly. A toggle 372 allows the pins to pass as the cover assembly is shifted over the piston at the end of the brewing cycle. However, the toggle 372 causes the pins to ride up into the return channel 362 on the return trip. This results in disengaging the wiper 340 from the surface of the piston on the return trip. This helps to prevent excessive wear on the filter portion of the piston and other benefits.

Brewing the removal portion of the travel of the wiper the pins 366 encounter the bumps 364. These cause the pins to agitate the wiper 340 up and down at the hinged structure 370. The shaking or bumping movement of the wiper 340 helps to assure that the spent brewing substance is dislodged from the wiper. On the return trip the bumps 364 are once again encountered helping to provide further assurance that the spent brewing substance is disengaged.

Knocking the loose moist grounds from the wiper 340 helps to assure that they are not redeposited on the brewing filter during the retraction portion. This also helps assure that grounds and other debris are not accumulated on the backside 354 of the squeegee edge 354.

Figure 31:
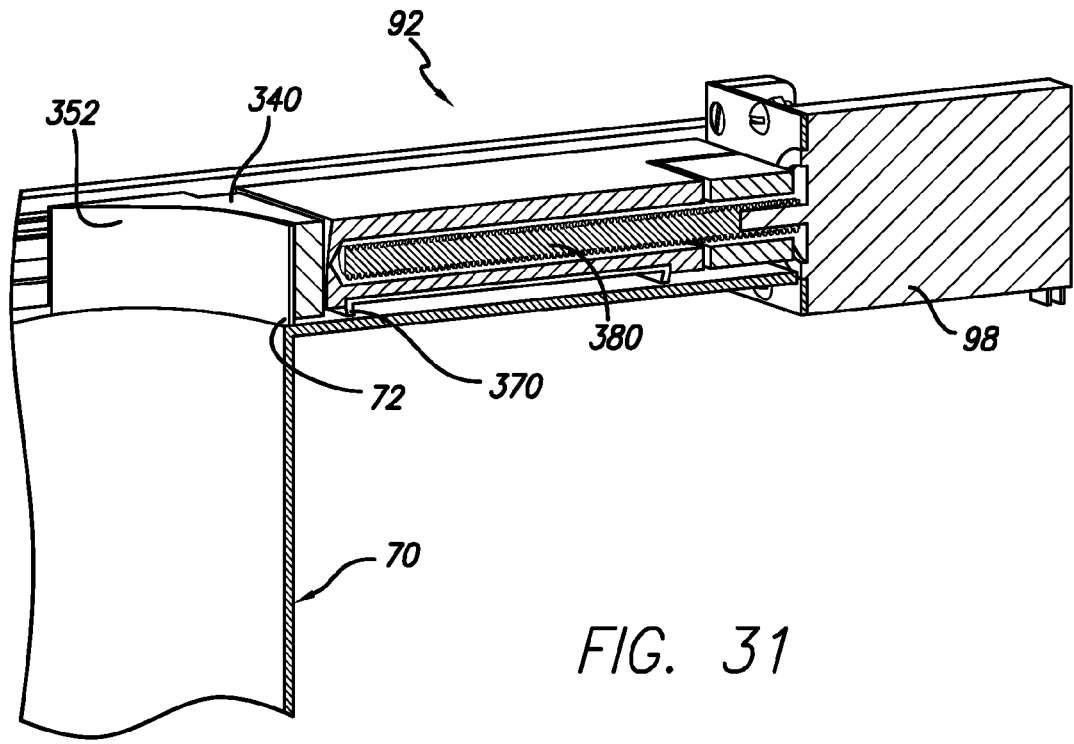
FIG. 31 is a cross sectional view of the trolley assembly.

FIG. 31 shows structures associated with the cover assembly including the lead screw 380 coupled to the motor 98 to generally linearly drive the assembly along the channels 94.

Additional pairs of guide channels 382, 384 and associated guide pins 386, 388 help to maintain a generally linear movement of the cover assembly relative to the chamber.

Figure 34:
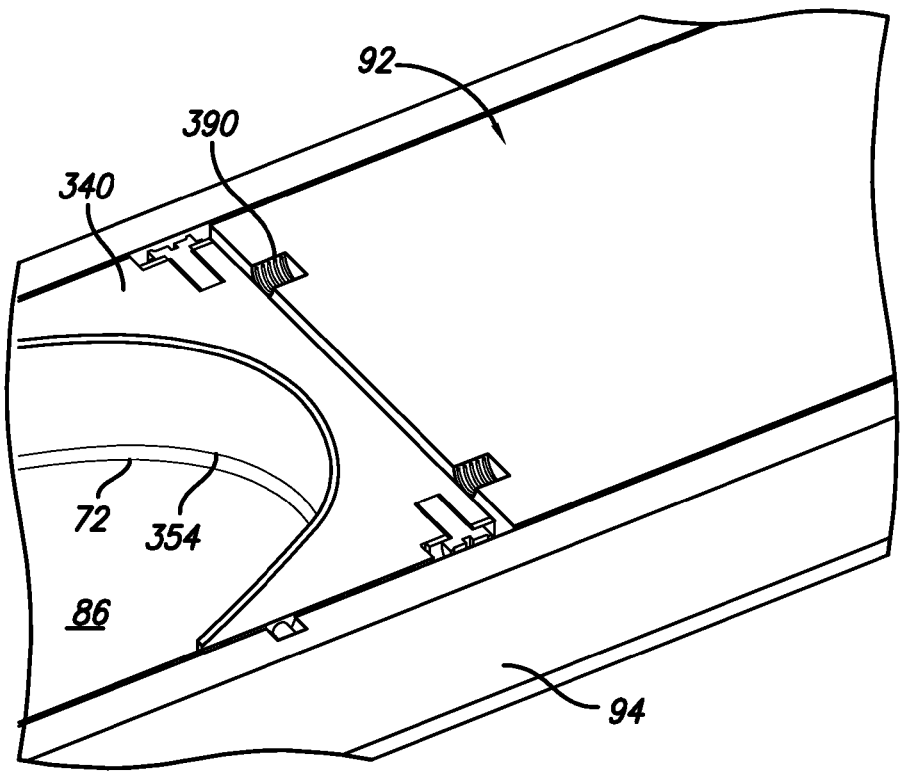
FIG. 34 is an enlarged view showing the structures.

With reference to FIG. 34, it can be seen that the wiper 340 retained is relative to the cover assembly by means of spring structures 390 proximate to the hinge 370. These provide a forward, downward action on the wiper 340 to engage a squeegee 352 relative to the filter 86. This results in better engagement of the leading edge 354 of the squeegee when cleaning the filter 86. The springs 390 are compressed when the assembly is retracted as described above.

Figure 35:
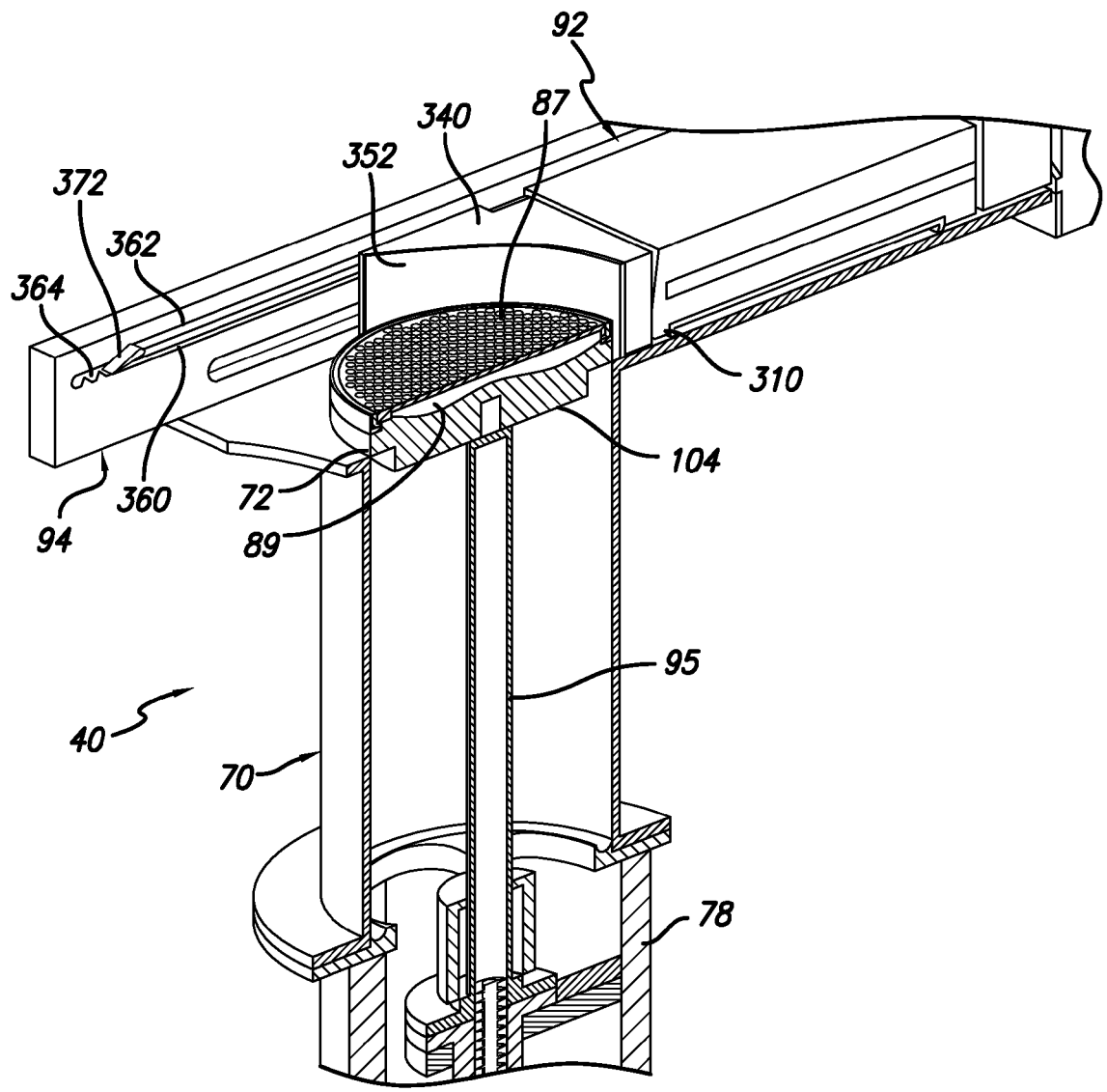
FIG. 35 is a cross sectional perspective view showing the piston in the upwardly most position for cleaning.

With reference to FIG. 35, it can be seen that the piston 104 can be upwardly displaced to allow it to be serviced. Servicing may include more detail cleaning, disassembly, replacement of seals as well as other actions. This also allows removal of the piston 104 for access to the shaft.

In the present mechanism, coffee is placed into the brew chamber and mixed with heated water to produce a brewed beverage. The mechanism operates to controllably compress the combination of water and coffee slurry so as to produce a brewed beverage and dispense it from the mechanism. Air agitation may be introduced to further enhance and achieve different characteristics of the brewed beverage. Also, the system can be controlled so as to control additional characteristics or achieve additional characteristics of the brewed beverage. The benefits of the upward compression of the slurry help to make the spent brewing substance more manageable at the end of the brewing cycle. Additionally, the dispensing of beverage through the filter carried on the piston helps maintain sanitary dispensing conditions and easily assessable and cleanable structures. In this regard, the piston is removable for cleaning of the filter and recesses. Similarly, the outlet tube 101 can be easily removed for sanitation or replacement. As such all of the food contact surfaces in the mechanism including the chamber can be easily, efficiently and thoroughly cleaned.

The movement of the piston 104 downwardly through the column 70 can be controlled to allow steep time. Also, the piston can be driven using the motor 110 to produce a pulsing effect. In other words, an initial complete volume of water can be allowed to steep with the brewing substance 190. After a predetermined period of time, the stepper motor 110 can pulse the piston 104 downwardly to dispense proportional volumes of beverage from the column 70. Alternatively, the piston 104 can be driven generally continuously to controllably dispense beverage from the column. Regardless of the technique used, a range of controllability of beverage dispensing can be provided by the present beverage mechanism 40 and the system associated with the apparatus 30.

As shown in FIG. 21, an agitating assembly 300 is provided. In the embodiment shown in FIG. 21 the agitating assembly 300 includes a check valve 302 carried in a chamber 304. Air is driven into the chamber 304 by way of an air pump 306 communicating with the chamber and coupled to the controller 47. The check valve 302 prevents liquids from flowing into the line connected to the pump 306. Air is introduced into the water and coffee slurry thereby agitating the slurry to enhance the contact between the coffee and water. Agitation can be operated at any opportune time during the brewing process. One example of use of agitation is after dispensing coffee and water into the column. Agitation of the coffee and water at this stage of the brewing cycle causes thorough wetting of all of the coffee particles to help enhance the use of the grounds during the brewing process. Other forms of agitating assembly 300 can be used with the present system such as, but not limited to, mechanical, magnetic, and acoustic agitators.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage apparatus comprising:
   a hollow body defining at least a portion of a brewing chamber;
   a piston controllably movable in at least a portion of the hollow body;
   a filter operatively associated with the hollow body;
   a liquid delivery system communicating with the hollow body;
   a controller for controllably dispensing liquid from the liquid delivery system into the hollow body for mixing with a beverage making substance disposed in the hollow body to produce a beverage, controllably moving the piston through the hollow body for dispensing through the filter a beverage produced from the liquid and beverage substance;

a beverage reservoir coupled to a dispensing nozzle and controllably communicating with the hollow body for selectively controllably receiving beverage dispensed from the hollow body for controllable accumulation of multiple servings of beverage therein and selective controlled dispensing of beverage therefrom; and a controllable valve communicating with the hollow body and coupled to the controller, the valve selectively controllably dispensing brewed beverage for human consumption to the reservoir or to a separate container via the dispensing nozzle.

2. The beverage apparatus of claim 1, further comprising an agitation assembly coupled to the controller and operatively associated with the hollow body for agitating beverage substance and liquid in the hollow body during a brewing cycle.

3. The beverage apparatus of claim 2, further comprising the agitation assembly operatively associated with the filter for providing agitation proximate to the filter.

4. The beverage apparatus of claim 2, in which the agitation assembly moves air through at least a portion of the hollow body for providing air agitation of beverage substance and liquid.

5. The beverage apparatus of claim 1, in which the piston is controllably operated downwardly through the hollow body to drive the combination of liquid and beverage substance against the filter to dispense beverage through the filter.

6. The beverage apparatus of claim 1, in which the piston is controllably operated upwardly through the hollow body to drive the combination of liquid and beverage substance against the filter to dispense beverage through the filter.

7. A beverage apparatus comprising:
a hollow body defining at least a portion of a brewing chamber;
a piston controllably movable in at least a portion of the hollow body;
a filter operatively associated with the hollow body;
a liquid delivery system communicating with the hollow body;
a controller for controllably dispensing liquid from the liquid delivery system into the hollow body for mixing with a beverage making substance disposed in the hollow body to produce a beverage, controllably moving the piston through the hollow body for dispensing through the filter a beverage produced from the liquid and beverage substance;
a beverage reservoir controllably communicating with the hollow body for selectively controllably receiving beverage dispensed from the hollow body for controllable accumulation of multiple servings of beverage therein and selective controlled dispensing of beverage therefrom; and
controllable means for selectively dispensing brewed beverage for human consumption from the hollow body to the reservoir or from the hollow body to a separate container.

* * * * *